United States Patent
Nakashio et al.

(10) Patent No.: US 7,511,928 B2
(45) Date of Patent: *Mar. 31, 2009

(54) MAGNETIC TUNNEL EFFECT TYPE MAGNETIC HEAD, AND RECORDER/PLAYER

(75) Inventors: Eiji Nakashio, Miyagi (JP); Seiji Onoe, Miyagi (JP); Junichi Sugawara, Miyagi (JP)

(73) Assignee: Sony Corporation, Tokyo (JP)

( * ) Notice: Subject to any disclaimer, the term of this patent is extended or adjusted under 35 U.S.C. 154(b) by 564 days.

This patent is subject to a terminal disclaimer.

(21) Appl. No.: 11/158,117

(22) Filed: Jun. 20, 2005

(65) Prior Publication Data

US 2005/0237675 A1    Oct. 27, 2005

Related U.S. Application Data

(63) Continuation of application No. 09/897,236, filed on Jul. 2, 2001, now Pat. No. 6,909,584.

(30) Foreign Application Priority Data

Jul. 6, 2000   (JP) ............................ P2000-205926

(51) Int. Cl.
*G11B 5/39* (2006.01)
(52) U.S. Cl. .................................................. 360/324.2
(58) Field of Classification Search ............. 360/324.2, 360/322
See application file for complete search history.

(56) References Cited

U.S. PATENT DOCUMENTS 6,381,107 B1 * 4/2002 Redon et al. ............. 360/324.2
6,624,987 B1 * 9/2003 Hayashi et al. .......... 360/324.2

* cited by examiner

*Primary Examiner*—Brian E Miller
(74) *Attorney, Agent, or Firm*—Sonnenschein Nath & Rosenthal LLP

(57) ABSTRACT

In a magnetic tunnel effect type magnetic head 20 having a magnetic tunnel junction element 26 sandwiched with conductive gap layers 25 and 27 between a pair of magnetic shielding layers 24 and 28, the conductive gap layers 25 and 27 are formed from at least one nonmagnetic metal layer containing a metal element selected from Ta, Ti, Cr, W, Mo, V, Nb and Zr. Therefore, the magnetic head 20 can have an improved face opposite to a magnetic recording medium.

2 Claims, 24 Drawing Sheets

MAGNETIC TUNNEL EFFECT TYPE MAGNETIC HEAD, AND RECORDER/PLAYER

RELATED APPLICATION DATA

The present application is a continuation of U.S. application Ser. No. 09/897,236 filed Jul. 2, 2001, now U.S. Pat. No. 6,909,584 which claims priority to Japanese Application No. P2000-205926 filed Jul. 6, 2000, all of which are incorporated herein by reference to the extent permitted by law.

BACKGROUND OF THE INVENTION

1. Field of the Invention

The present invention relates to a magnetic tunnel effect type magnetic head having a magnetic tunnel junction element sandwiched with conductive gap layers between a pair of magnetic shielding layers, and a recorder/player adapted to record and/or play back a signal to and/or from a magnetic recording medium by the use of the magnetic tunnel effect type magnetic head.

2. Description of the Related Art

It is well known as a so-called magnetic tunnel effect that in a laminated structure having a thin insulative layer sandwiched between a pair of magnetic layers, when a predetermined voltage is applied between the pair of magnetic layers, the conductance of a so-called tunnel current varies depending upon the relative angle of magnetization between the pair of magnetic layers. That is, the laminated structure having the thin insulative layer sandwiched between the pair of magnetic layers shows a magneto-resistive effect to the tunnel current flowing through the insulative layer.

With the magnetic tunnel effect, it is possible to theoretically calculate the magneto-resistive coefficient or ratio between the pair of magnetic layers owing to the polarizability of the magnetic layers when magnetized, and more specifically, to have a magneto-resistive coefficient or ratio of about 40% in case the pair of magnetic layers is formed from Fe.

Thus, as a magneto-resistive effect element, the magnetic tunnel junction element (will be referred to as "TMR element" hereunder) having a laminated structure having a thin insulative layer sandwiched between a pair of magnetic layers has been attracting the attention in the field of this art. Especially in the field of magnetic heads, attention is focused on a so-called magnetic tunnel effect type magnetic head (will be referred to as "TMR head" hereunder) using the TMR element as a magneto-sensitive element to detect a magnetic signal from a magnetic recording medium.

Referring now to FIG. 1, there is schematically illustrated such a conventional TMR head by way of example. FIG. 1 is a schematic end view of the TMR head from a recording medium side. The TMR head is generally indicated with a reference 100.

As shown in FIG. 1, the TMR head 100 is a so-called shielded TMR head having a TMR element 104 sandwiched with a gap layer 103 between a pair of upper and lower magnetic shielding layers 101 and 102. The TMR head 100 is of a laminated structure in which the above component elements are formed on a substrate 105 by the thin-film laminating process. In the TMR head 100, the pair of magnetic shielding layers 101 and 102 functions as electrodes for the TMR element 104. There are sandwiched between the pair magnetic shielding layers 101 and 102 nonmagnetic conductive layers 106 and 107 of the gap layer 103 which electrically connect the pair of shielding layers 101 and 102 and the TMR element 104 to each other. Also, in the TMR head 100, a part of the TMR element 104, abutting a projection 107a of the nonmagnetic conductive layer 107, serves as a magnetic sensor portion 104a of the TMR element 104. The magnetic sensor portion 104a has a reading track width of Tw.

Referring now to FIG. 2, there is schematically illustrated a conventional shielded MR (magneto-resistive) head by way of example. FIG. 2 is a schematic end view of the MR head from a recording medium side. The MR head is generally indicated with a reference 200. As shown in FIG. 2, the MR head 200 has an MR element 204 and a pair of upper and lower conductive layers 205 and 206 formed at either end of the MR element 204, sandwiched with a gap layer 203 between a pair of upper and lower magnetic shielding layers 201 and 202. The MR head 200 is of a laminated structure in which the above component elements are formed on a substrate 207 by the thin-film forming process. In the MR head 200, a part of the MR element 204, laid between the pair of conductive layers 205 and 206, serves as a magnetic sensor portion 204a of the MR element 204. The magnetic sensor 204a has a reading track width of Tw.

In the shielded MR head 200, as the gap is decreased for a higher recording density, the nonmagnetic nonconductive layer which forms the gap layer 203 is thinner. More specifically, because of steps formed by the pair of conductive layers 205 and 206 disposed on the opposite ends of the MR element, it is difficult to form the upper nonmagnetic nonconductive layer to a uniform thickness over the MR element 204. In case the distance between the pair of magnetic shielding layers 201 and 202 and the MR element 204, that is, the inter-shield distance, is decreased for reading a signal recorded with a high density in a magnetic recording medium, it is extremely difficult to secure an insulation between the pair of magnetic shielding layers 201 and 202 and the MR element 204.

On the contrary, in the TMR head 100 shown in FIG. 1, the pair of magnetic shielding layers 101 and 102 function as electrodes so that the gap layer 103 can be made thin and thus the distance between the pair of magnetic shielding layers 101 and 102 and the TMR element 104 can be decreased. Therefore, in the TMR head 100, the gap can be made narrow to enable a high density of recording to a magnetic recording medium.

For production of the above-mentioned TMR head 100, a generally disc-like substrate is prepared, the component elements of the TMR head 100 are formed one on the other on the substrate by the thin-film forming process, and then the substrate is cut into individual head chips, thereby producing a plurality of TMR heads 100 collectively.

However, in the process of producing the TMR head 100, the nonmagnetic conductive layers 106 and 107 forming together the gap layer 103 are elongated without being polished, when the height of the TMR element 104 in the direction of its depth is adjusted by polishing it on a surface plate, so that the pair of magnetic shielding layers 101 and 102 sandwiching the TMR element 104 between them will electrically be short-circuited between them as the case may be. That is, a defect 108 is caused in the medium-opposite face of the produced TMR head 100 by the elongation of the nonmagnetic conductive layers 106 and 107 in some cases as shown in FIG. 3.

In this TMR head 100 thus produced, no current will flow through the magnetic sensor portion 104a of the TMR element 104 and little playback output will be detected from the magnetic recording medium.

OBJECT AND SUMMARY OF THE INVENTION

It is therefore an object of the present invention to overcome the above-mentioned drawbacks of the prior art by providing an improved-yield, high-quality magnetic head of a magnetic tunnel effect type having a structure in which a magnetic tunnel junction element is sandwiched with conductive gap layers between a pair of magnetic shielding layers and thus having an improved face opposite to a magnetic recording medium, and a recorder/player which records and/or plays back a signal to and/or from a magnetic recording medium by the use of such an MR head.

The above object can be attained by providing a magnetic tunnel effect type magnetic head having a magnetic tunnel junction element sandwiched with conductive gap layers between a pair of magnetic shielding layers. The conductive gap layer is formed from at least one nonmagnetic metal layer containing a metal element selected from Ta, Ti, Cr, W, Mo, V, Nb and Zr.

Since the conductive gap layer in the above magnetic tunnel effect type magnetic head is formed from at least one nonmagnetic metal layer containing a metal element selected from Ta, Ti, Cr, W, Mo, V, Nb and Zr, the magnetic head can have an improved face opposite to a magnetic recording medium.

Also, the above object can be attained by providing a magnetic tunnel effect type magnetic head having a magnetic tunnel junction element sandwiched with conductive gap layers between a pair of magnetic shielding layers. The conductive gap layer is formed from at least one nonmagnetic metal layer containing an alloy of two or more elements selected from Al, Pt, Cu, Au, Ta, Ti, Cr, W, Mo, V, Nb and Zr.

Since the conductive gap layer in the above magnetic tunnel effect type magnetic head is formed from at least one nonmagnetic metal layer containing an alloy of two or more elements selected from Al, Pt, Cu, Au, Ta, Ti, Cr, W, Mo, V, Nb and Zr, the magnetic head can have an improved face opposite to a magnetic recording medium.

Also, the above object can be attained by providing a recorder/player which records and/or plays back a signal to and/or from a magnetic recording medium by the use of a magnetic tunnel effect type magnetic head having a magnetic tunnel junction element sandwiched with conductive gap layers between a pair of magnetic shielding layers. The conductive gap layer in the magnetic tunnel effect type magnetic head is formed from at least one nonmagnetic metal layer containing a metal element selected from Ta, Ti, Cr, W, Mo, V, Nb and Zr. Therefore, the recorder/player can record and/or play back a signal to and/or from the magnetic recording medium.

Since the conductive gap layer in the magnetic tunnel effect type magnetic head used in the above recorder/player is formed from at least one nonmagnetic metal layer containing a metal element selected from Ta, Ti, Cr, W, Mo, V, Nb and Zr, the magnetic head can have an improved face opposite to a magnetic recording medium.

Also, the above object can be attained by providing a recorder/player which records and/or plays back a signal to and/or from a magnetic recording medium by the use of magnetic tunnel effect type magnetic head having a magnetic tunnel junction element sandwiched with conductive gap layers between a pair of magnetic shielding layers. The conductive gap layer in the magnetic tunnel effect type magnetic head is formed from at least one nonmagnetic metal layer containing an alloy of two or more elements selected from Al, Pt, Cu, Au, Ta, Ti, Cr, W, Mo, V, Nb and Zr.

Since the conductive gap layer in the magnetic tunnel effect type magnetic head used in the above recorder/player is formed from at least one nonmagnetic metal layer containing an alloy of two or more elements selected from Al, Pt, Cu, Au, Ta, Ti, Cr, W, Mo, V, Nb and Zr, the magnetic head can have an improved face opposite to a magnetic recording medium. Therefore, the recorder/player can record and/or play back a signal to and/or from the magnetic recording medium.

These objects and other objects, features and advantages of the present intention will become more apparent from the following detailed description of the preferred embodiments of the present invention when taken in conjunction with the accompanying drawings.

DETAILED DESCRIPTION OF THE PREFERRED EMBODIMENTS

Note that the drawings referred to in the following description were prepared with characteristic portions of the magnetic head being enlarged in scale for easier understanding and thus not all the dimensional ratios between the component elements of the magnetic head are the same as those in the actual magnetic head according to the present invention.

Figure 1:
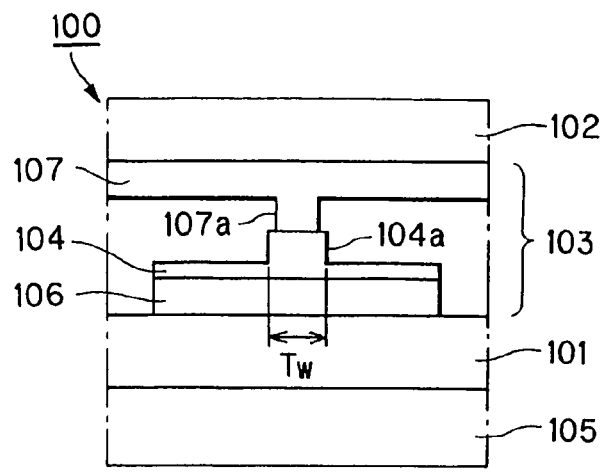
FIG. 1 is an end view of the essential portion of the conventional shielded TMR head from the face thereof opposite to a recording medium, taken for explanation of the construction of the TMR head.
Figure 2:
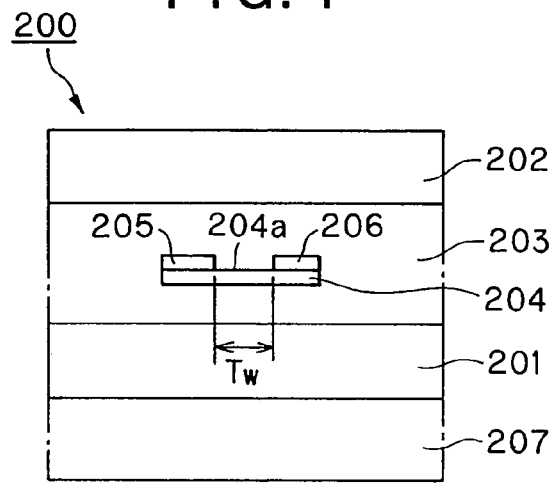
FIG. 2 is an end view of the essential portion of the conventional shielded TMR head from the face thereof opposite to a recording medium, taken for explanation of the construction of the TMR head.
Figure 3:
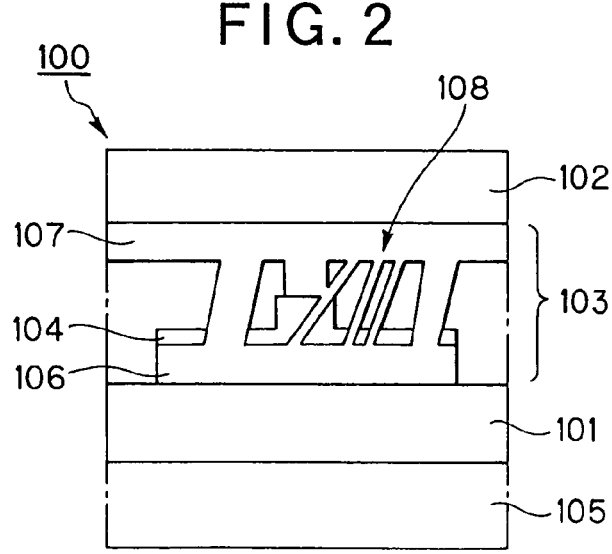
FIG. 3 is an end view showing the shielded TMR head in which a defect has taken place.
Figure 4:
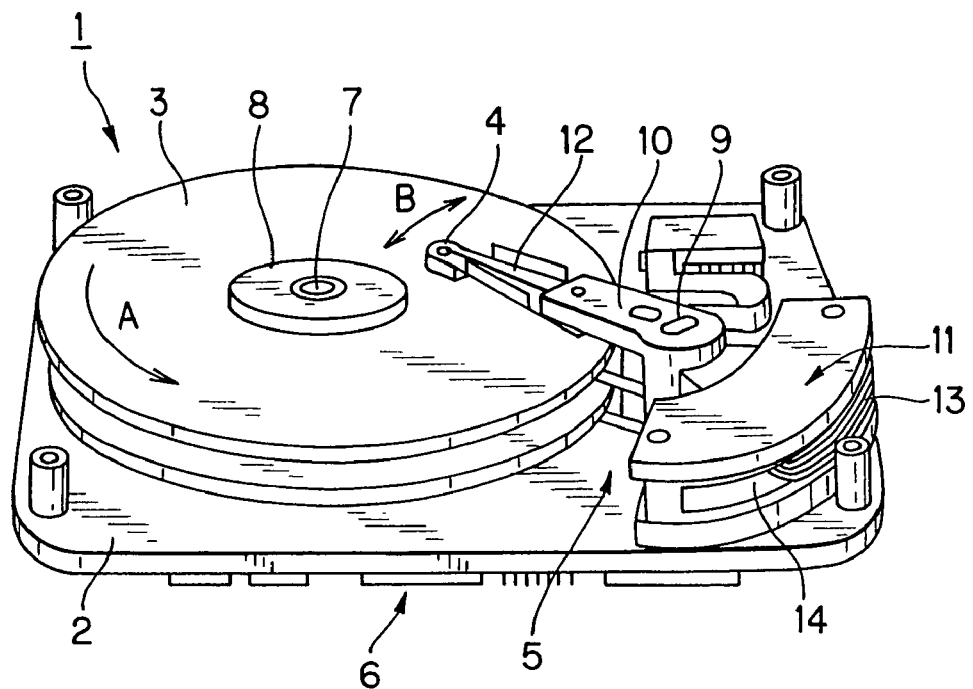
FIG. 4 is a schematic perspective view of an example of hard disc drive.

Referring now to FIG. 4, there is schematically illustrated in the form of a schematic perspective view a hard disc drive as an embodiment of the present invention. The hard disc drive body is generally indicated with a reference 1. Normally, the hard disc drive body 1 is encased in an enclosure (not shown). As shown, the hard disc drive body 1 has a chassis 2 on which there are provided magnetic discs 3 rotated by a spindle motor (not shown), and a head actuator 5 provided at an end thereof with a head slider 4 having mounted thereon a magnetic head which writes or reads an information signal to or from the magnetic disc 3.

The hard disc drive is further provided, on a side of the chassis 2 opposite to the side on which the magnetic disc 3, head actuator 5 etc. are installed, with a signal processing circuit to process the information signal at the time of information write or read, control circuits 6 including a servo control circuit for servo control of the magnetic head, system controller to control the entire system and other control circuits.

The magnetic disc 3 is a so-called hard disc, and includes a generally disc-shaped substrate having a central hole formed therein, and a magnetic layer, protective layer, etc. formed one on the other on the substrate. In this hard disc drive, a plurality of magnetic discs 3 is fitted at the central hole thereof on a rotary shaft 7 of the spindle motor and fixed by a damper 8. As the spindle motor controlled by the control circuit is rotated, the magnetic disc 3 is rotated at a predetermined velocity in the direction of arrow A in FIG. 4.

The head actuator 5 includes a support arm 10 pivotable about a spindle 9 thereof, a voice coil motor 11 provided at one end of the support arm 10, a suspension 12 fixed at the other end of the support arm 10 and having a predetermined elasticity, and the head slider 4 installed to the free end of the suspension 12.

The voice coil motor 11 has a coil 13 installed to the support arm 10 and a magnet 14 installed to the chassis 2 oppositely to the coil 13. When supplied with a current, the coil 13 generates a magnetic field, and the magnetic action with the magnet 14 disposed opposite to the coil 13 will have the support arm 10 rotate through a predetermined angle about the spindle 9 in the direction of arrow B in FIG. 4, that is, radially of the magnetic disc 3.

Further, the suspension 12 has the head slider 4 mounted on the free end thereof. It elastically forces the head slider 4 towards the magnetic disc 3 while supporting the had slider 4.

Figure 5:
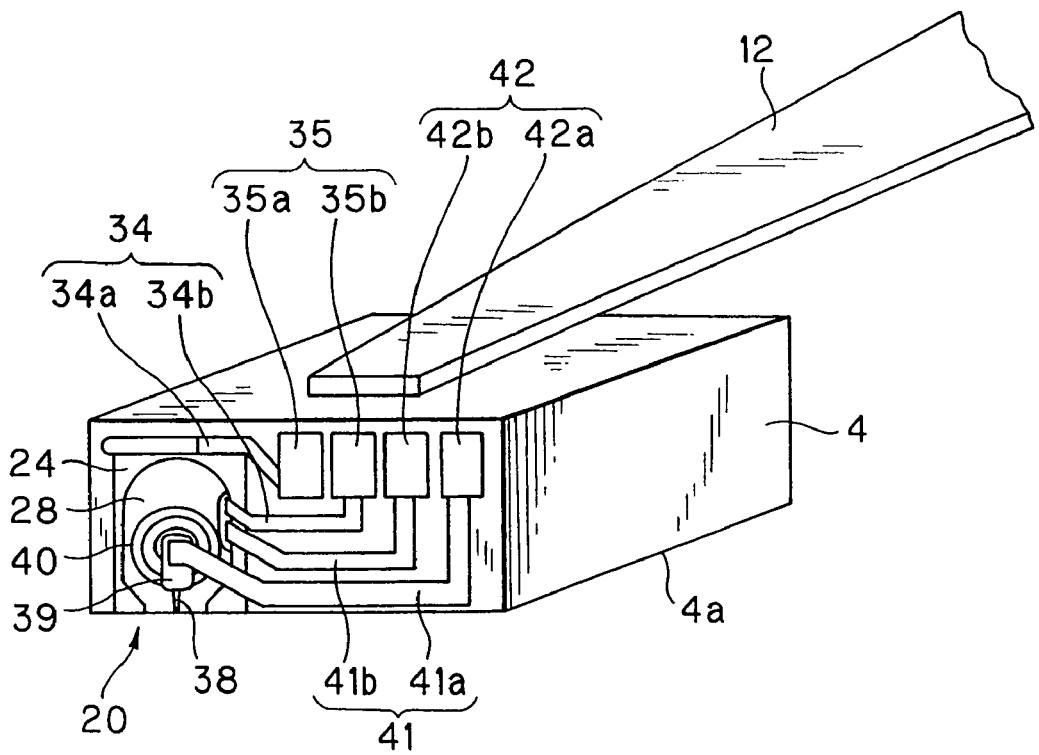
FIG. 5 is a schematic perspective view of a head slider of the hard disc drive shown in FIG. 4.

As will be seen from FIGS. 4 and 5, the head slider 4 is molded to be generally rectangular and so supported on the free end of each suspension 12 of each support arm 10 provided for each magnetic disc 3 as to be opposite to the signal recording layer of the magnetic disc 3. Also, the head slider 4 has a surface 4a opposite to the magnetic disc 3 (the surface will be referred to as "medium-opposite face" hereunder), on which there is formed an airborne surface (ABS) to produce a levitation force by an air flow produced when the magnetic disc 3 is rotated.

More specifically, while the head slider 4 installed at the free end of the suspension 12 is being levitated a predetermined distance off and over the magnetic disc 3 by an air flow produced by the magnetic disc 3 being rotated, the magnetic head 20 mounted on the head slider 4 writes or reads a signal to or from the signal recording layer of the magnetic disc 3. Note that the shape of the ABS surface of the head slider 4 is not limited to any special one but may be an arbitrary one.

The magnetic head is generally indicated with a reference 20. As shown in FIG. 4, the magnetic head 20 is positioned at the rear end of the head slider 4 traveling in levitation oppositely to the magnetic disc 3 rotated in the direction of arrow A in FIG. 4.

Figure 6:
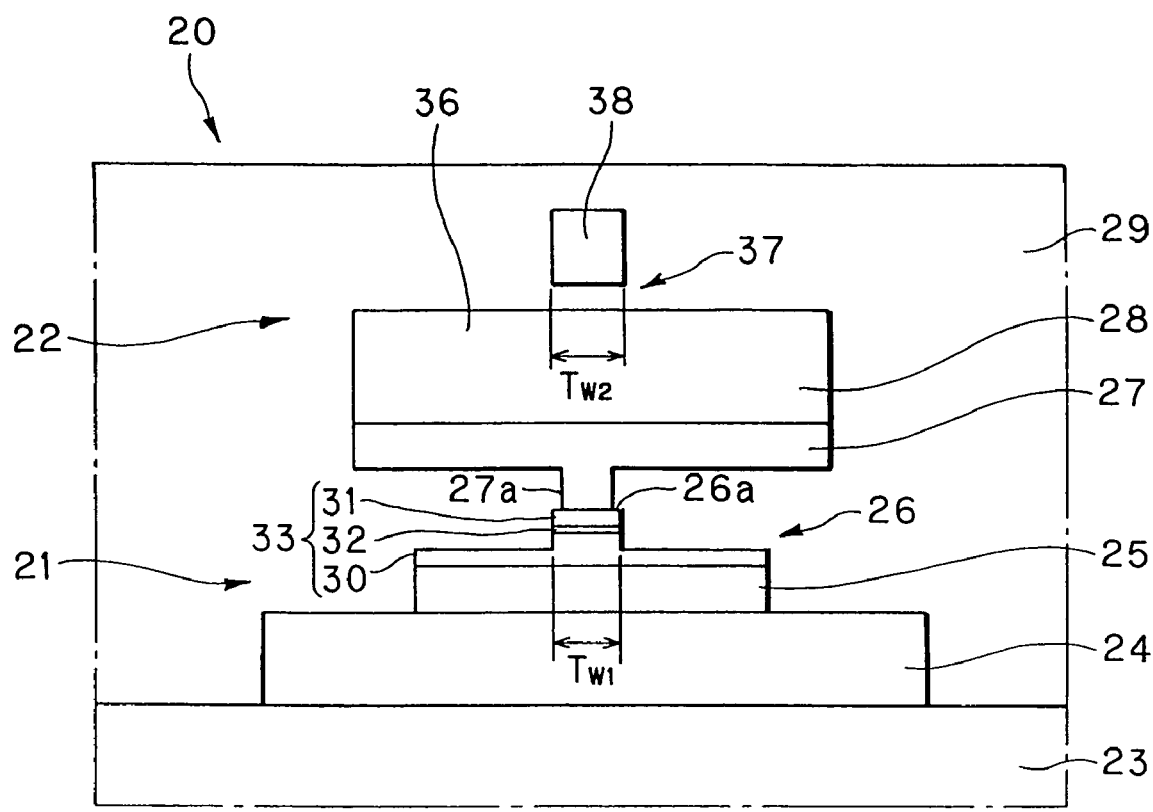
FIG. 6 is an end view of the essential portion of the magnetic head according to the present invention, from the face thereof opposite to a recording medium.

As shown in FIGS. 5 and 6, the magnetic head 20 is a composite type thin-film magnetic head including a combination of a magnetic tunnel effect type magnetic head (will be referred to as "TMR head" hereunder) 21 as a read head and an inductive type thin-film head 22 as a write head, for example. Note that FIG. 6 is a schematic end view of the magnetic head 20 from the medium-opposite face 4a.

In the magnetic head 20, component elements such as the read and write heads are formed by a thin-film forming technology such as plating, sputtering or the like. Therefore, advantageously, the track and gap can easily be reduced in size and write/read be done with a high resolution.

More particularly, the magnetic head 20 is produced by adopting a thin-film laminating process which will further be described later. In the magnetic head 20, the TMR head 21 as a read head to read a signal from the magnetic disc 3 under the magnetic tunnel effect is formed on a substrate 23 of a hard nonmagnetic material such as alumina titanium carbide ($AL_2O_3$—TiC), and the inductive type thin-film head 22 as a write head to write a signal to the magnetic disc 3 by the action of electromagnetic induction. In the magnetic head 20, the component elements forming each of the read and write heads are exposed from the medium-opposite face 4a and generally flush with each other.

The TMR head 21 and inductive type thin-film head 22 will further be described below. First, the above TMR head 21 is a so-called shielded TMR head including a magnetic tunnel junction element (will be referred to as "TMR element" hereunder) sandwiched with shielding gap layers between a pair of upper and lower magnetic shielding layers. More specifically, the TMR head 21 includes, as shown in FIG. 6, a lower shielding layer 24 formed on the substrate 23, a lower nonmagnetic conductive layer 25 formed on the lower shielding layer 24, a TMR element 26 formed on the lower nonmagnetic conductive layer 25, an upper nonmagnetic conductive layer 27 formed on the TMR element 26, and an upper shielding layer 28 formed on the upper nonmagnetic conductive layer 27. A nonmagnetic nonconductive material 29 such as $Al_2O_3$ is filled in the space around the layers including from the substrate 23 to the upper shielding layer 28.

The TMR element 26 is a magnetic sensor which detects a signal from the magnetic disc 3 under the so-called magnetic tunnel effect. The magnetic tunnel effect is such that the conductance of a tunnel current flowing through the TMR element 26 varies depending upon the direction of magnetization by a magnetic field from the magnetic disc 3. The magnetic tunnel effect is used to detect a voltage change of the tunnel current and read a signal recorded in th magnetic disc 3.

More specifically, the TMR element 26 includes a magnetic tunnel junction layer 33 formed by laminating a fixed-magnetization layer 30 magnetizable only in a predetermined fixed direction and a free-magnetization layer 31 magnetizable in a direction which varies depending upon an external magnetic field, with a tunnel barrier layer 32 laid between these layers 30 and 31.

In the magnetic tunnel junction layer 33, the fixed-magnetization layer 30 has a three-layer structure in which, for example, an NiFe layer of 3 nm in thickness, IrMn layer of 10 nm in thickness and a CoFe layer of 4 nm in thickness are laminated one on the other on a Ta layer of 3 nm in thickness formed as a lower layer on the lower nonmagnetic conductive layer 25. The above IrMn layer is an antiferromagnetic layer which is in exchange coupling with the CoFe layer which is thus magnetized in a predetermined direction.

Also, the tunnel barrier layer 32 is for example an aluminum oxide ($Al_2O_3$) layer of 1.3 nm in thickness as an insulative layer formed on the CoFe layer of the fixed-magnetization layer 30.

The free-magnetization layer 31 is of a two-layer structure in which for example, a CoFe layer of 4 nm in thickness is formed on the tunnel barrier layer 32 and an NiFe layer of 5 nm in thickness is formed on the CoFe layer. Further on the free-magnetization layer 31, there is formed for example a Ta layer of 5 nm in thickness as an upper layer. The above CoFe layer is intended to increase the spin polarizability. The NiFe layer has a small coercive force and thus is magnetizable in a direction depending upon the external magnetic field. These CoFe and NiFe layers form together a magnetic sensor 26a of the TMR element 26.

When the magnetic tunnel junction layer 33 is made of such a spin valve laminated structure, the TMR element 26 can have a large magneto-resistive coefficient or ratio. Note that the materials and thickness of the layers forming the magnetic tunnel junction layer 33 are not limited to those having been described in the above but the layers may be formed from materials appropriately selected and in appropriate thickness, respectively, according to the purpose of use of the TMR element 26.

The TMR element 26 is etched in a range from the free-magnetization layer 31 to the middle of the fixed-magnetization layer 30 while leaving not etched the portion of the magnetic tunnel junction layer 33 which is to be the magnetic sensor 26a of the TMR element 26, so that the track width $Tw_1$ relative to the magnetic disc 3 is limited. Note that in this embodiment, the track width $Tw_1$ is about 5 μm but it may be set to an appropriate value according to the system requirement etc.

In the TMR head 21, the lower shielding layer 24 and lower nonmagnetic conductive layer 25 function as electrodes of the fixed-magnetization layer 30 of the TMR element 26 while the upper shielding layer 28 and upper nonmagnetic conductive layer 27 function as electrodes of the fee-magnetization layer 31, so that a tunnel current will flow through the tunnel barrier layer 32 to the TMR element 26.

More particularly, in the lower nonmagnetic conductive layer 25, the fixed-magnetization layer 30 of the TMR element 26 is electrically connected to the lower shielding layer 24. On the other hand, the upper nonmagnetic conductive layer 27 has a projection 27a which abuts a portion of the TMR element 26 which is to be the magnetic sensor 26a, and thus the free-magnetization layer 31 of the TMR element 26 and the upper shielding layer 28 are electrically connected to each other via the projection 27a.

The lower nonmagnetic conductive layer 25 and upper nonmagnetic conductive layer 27 form, together with a nonmagnetic nonconductive material 29 disposed in a clearance between the TMR element 26 and the lower and upper shielding layers 24 and 28, a shielding gap layer which magnetically isolates the TMR element 26 and the lower and upper shielding layers 24 and 28 from each other.

The lower and upper shielding layers 24 and 28 are formed each from an amorphous lamination layer of CoZrNbTa of 2.3 µm in thickness for example. The lower and upper shielding layers 24 and 28 will supply an electricity to the TMR element 26 through the lower and upper nonmagnetic conductive layers 25 and 27.

The lower and upper shielding layers 24 and 28 are wide enough to magnetically shield the TMR element 26 and thus provide a pair of magnetic shielding layers which sandwiches the TMR element 26 between the lower and upper nonmagnetic conductive layers 25 and 27 laid between them, thereby preventing a portion, not to be read, of a signal magnetic field from the magnetic disc 3 from being led to the TMR element 26. That is, in the TMR head 21, a signal magnetic field not to be read by the TMR element 26 is led to the lower and upper shielding layers 24 and 28 while only a signal magnetic field to be read is led to the TMR element 26. Thus, in the TMR head 21, the TMR element 26 has an improved frequency characteristic and reading resolution.

In the TMR head 21, the distance between the lower and upper shielding layers 24 and 28 and the TMR element 26 is a so-called inter-shield distance (gap length).

In the TMR head 21, there are provided lead wires 34a and 34b electrically connected to the lower and upper shielding layers 24 and 28, respectively, as shown in FIG. 5. External connection terminals 35a and 35b are provided at ends of the lead wires 34a and 34b so as to be exposed from the read end face of the head slider 4.

The lead wires 34a and 34b are formed thin from a conductive material such as copper (Cu). Also, the external connection terminals 35a and 35b are formed from a conductive material such as gold (Au), and can be put into contact with an external circuit when conductors also formed from gold (Au) are electrically connected to wiring terminals provided on the suspension 12 by wire bonding or the like method.

On the other hand, the inductive type thin-film head 22 includes, as shown in FIGS. 5 and 6, a lower core layer 36 formed from the same material as that of the upper shielding layer 28, an upper core layer 38 formed on the lower core layer 36 with a magnetic gap 37 laid between them, a back yoke 39 joined to the upper core layer 38 and forming together with the lower core layer 36 a back gap at the other end spaced from the medium-opposite face 4a. The clearance between the lower and upper core layers 36 and 38 is filled also with the nonmagnetic nonconductive material 29 such as Al$_2$O$_3$ for example.

In the inductive type thin-film head 22, there are provided between the lower core layer 36 and back yoke 39 a thin-film coil 40 wound about the back gap and lead wires 41a and 41b electrically connected between the inner circumferential end and outer circumferential end of the thin-film coil 40. External connection terminals 42a and 42b are provided at ends of the lead wires 41a and 41b so as to be exposed from the read end of the head slider 4.

The lower and upper core layers 36 and 38 and back yoke 39 form together a magnetic core being a closed magnetic circuit. The core layer 38 is molded from a conductive soft magnetic material such as amorphous lamination layer to have a predetermined width. The core layer 38 is disposed opposite to the lower core layer 36 with the nonmagnetic nonconductive material 29 laid between them to form the magnetic gap 37 whose width is a track width Tw$_2$. Note that the track width Tw$_2$ may be set to an appropriate value according to the system requirement etc.

Note that in the inductive type thin-film head 22, a fringing field taking place at the magnetic gap 37 can be thinned by forming a concavity in the lower core layer 36 oppositely to the upper core layer 38 whose width corresponds to the track width Tw$_2$, whereby even a weak magnetic signal can be recorded to the magnetic disc 3 with a high accuracy.

The thin-film coil 40 is spirally formed from a conductive materials such as Cu.

The lead wires 41a and 41b are formed thin from a conductive material such as Cu similarly to the aforementioned lead wires 34.

Also, the external connection terminals 42a and 42b are formed from a conductive material such as gold (Au) similarly to the aforementioned external connection terminals 35 (35a and 35b), and can be put into contact with an external circuit when conductors also formed from gold (Au) are electrically connected to wiring terminals provided on the suspension 12 by wire bonding or the like method.

In the magnetic head 20, the head slider 4 has formed on the rear end face thereof except for a portion thereof where the external connection terminals 35 and 42 are exposed a protective layer of the nonmagnetic nonconductive material 29 such as Al$_2$O$_3$ to protect the thin-film coil 40 and lead wires 34 and 41.

When a signal is read from the magnetic disc 3 by the TMR head 21 of the magnetic head 20 constructed as having been described in the foregoing, a predetermined voltage is applied between the fixed-magnetization layer 30 and free-magnetization layer 31 of the TMR element 26. At this time, the conductance of a tunnel current flowing through the tunnel barrier layer 32 of the TMR element 26 varies correspondingly to a signal magnetic field from the magnetic disc 3. Thus, in the TMR head 21, the voltage value of the tunnel current through the TMR element 26 will vary. By detecting a variation of the voltage value of the TMR element 26, the signal can be read from the magnetic disc 3.

On the other hand, when a signal is written to the magnetic disc 3 by the inductive type thin-film head 22, the thin-film coil 40 is supplied with a current corresponding to a signal to be written. At this time, in the inductive type thin-film head 22, a magnetic field from the thin-film coil 40 will give a magnetic flux to the magnetic core and cause a fringing field to take place from the magnetic gap 37. Thus, with the inductive type thin-film head 22, the signal can be written to the magnetic disc 3 by applying the fringing field to the magnetic disc 3.

In the magnetic head 20, the TMR head 21 being a read head is the magnetic tunnel effect type magnetic head according to the present invention. The lower and upper nonmagnetic conductive layers 25 and 27 of the TMR head 21 are formed each from at least one nonmagnetic metal layer containing a metal element selected from Ta, Ti, Cr, W, Mo, V, Nb and Zr.

Namely, each of the lower and upper nonmagnetic conductive layers 25 and 27 is formed from a single layer containing a metal element selected from Ta, Ti, Cr, W, Mo, V, Nb and Zr or a lamination of at least two layers containing a metal element selected from Ta, Ti, Cr, W, Mo, V, Nb and Zr.

Conventionally, aluminum (Al) is used to form the nonmagnetic metal layer. However, the material such as Ta, Ti, Cr, W, Mo, V, Nb or Zr used to form the nonmagnetic metal layer in the present invention is relatively hard and superior in mechanical characteristic to the aluminum.

According to the present invention, the TMR head 21 has the nonmagnetic layer formed from the nonmagnetic conductive material superior in mechanical characteristic to aluminum (Al). When the surface of the nonmagnetic metal layer which is to be the medium-opposite face 4a is polished in the process of producing the TMR head, which will further be described later, it can be prevented that the nonmagnetic metal layers which are to provide the lower and upper nonmagnetic conductive layers 25 and 27 will be elongated without being polished and thus a defect will be caused in the medium-opposite face 4a of the TMR head 21 by the elongation of the nonmagnetic metal layers.

In the TMR head 21, the lower and upper nonmagnetic conductive layers 25 and 27 may be formed each from at least two nonmagnetic metal layers including a metal layer containing a metal element selected from Ta, Ti, Cr, W, Mo, V, Nb and Zr and a metal layer containing a metal element selected from Al, Pt, Cu and Au.

That is, each of the lower and upper nonmagnetic conductive layers 25 and 27 may be formed from a lamination in at least two layers of a metal layer containing a metal element selected from Ta, Ti, Cr, W, Mo, V, Nb and Zr and a metal layer containing a metal element selected from Al, Pt, Cu and Au.

Also in this TMR head 21, when the surface of the nonmagnetic metal layer which is to be the medium-opposite face 4a is polished in the process of producing the TMR head, which will further be described later, it can be prevented that the nonmagnetic metal layers which are to provide the lower and upper nonmagnetic conductive layers 25 and 27 will be elongated without being polished and thus a defect will be caused in the medium-opposite face 4a of the TMR head 21 by the elongation of the nonmagnetic metal layers.

In this case, of the lamination of two or more nonmagnetic metal layers, the metal layer containing a metal element selected from Al, Pt, Cu and Au can have a surface formed to have a good surface roughness and excellent smoothness. Since the very smooth metal layer is used to form the nonmagnetic metal layer which is to provide the lower nonmagnetic conductive layer 25, it can be prevented that in the TMR element 26 formed on the lower nonmagnetic conductive layer 25, the tunnel barrier layer 32 formed extremely thin will be ruptured between the fixed- and free-magnetization layers 30 and 31 which will thus be put into contact with each other, resulting in an electric short-circuit between them.

Therefore, in the TMR head 21, it is possible to prevent the magneto-resistive coefficient of the TMR element 26 from being lower and thus assure a stable playback output.

Also in the TMR head 21, the lower and upper nonmagnetic conductive layers 25 and 27 may be formed from at least one nonmagnetic metal layer containing an alloy of two or more elements selected from Al, Pt, Cu, Au, Ta, Ti, Cr, W, Mo, V, Nb and Zr.

That is, the lower and upper nonmagnetic conductive layers 25 and 27 may be formed from a single layer containing an alloy of two or more elements selected from Al, Pt, Cu, Au, Ta, Ti, Cr, W, Mo, V, Nb and Zr or a lamination of at least two layers containing an alloy of two or more elements selected from Al, Pt, Cu, Au, Ta, Ti, Cr, W, Mo, V, Nb and Zr Also in this TMR head 21, when the surface of the nonmagnetic metal layer which is to be the medium-opposite face 4a is polished in the process of producing the TMR head, which will further be described later, it can be avoided that the nonmagnetic metal layers which are to provide the lower and upper nonmagnetic conductive layers 25 and 27 will be elongated without being polished and thus a defect will be caused in the medium-opposite face 4a of the TMR head 21 by the elongation of the nonmagnetic metal layers.

Also it can be avoided that in the TMR element 26, the tunnel barrier layer 32 being extremely thin is ruptured between the fixed- and free-magnetization layers 30 and 31 which will thus be put into contact with each other, resulting in an electric short-circuit between them.

As having been described in the foregoing, since the TMR head 21 can have the good opposite face 4a opposite to the magnetic disc 3 and the gap between the TMR element 26 and lower and upper shielding layers 24 and 28 can be narrow, it is possible to record data to a magnetic recording medium with a high density.

Also, in this hard disc drive, since the TMR head 21 can have a good face 4a opposite to the magnetic disc 3, it can provide a stable playback output and properly read data from the magnetic disc 3.

Next, the method of producing the head slider 4 on which the aforementioned magnetic head 20 is mounted will be described.

Note that in the drawings referred to in the following description, characteristic portions of the magnetic head are enlarged in scale as in FIGS. 4 to 6 for easier understanding and thus not all the dimensional ratios between the component elements are the same as those in the actual magnetic head according to the present invention. Also, in the following description, component elements of the magnetic head 20, materials, sizes and layer thickness of the component elements will be described in detail; however, the present invention are not limited to the embodiments which will be described herebelow. For example, a so-called shielded TMR head having a similar structure to that actually used in the hard disc drives will be described by way of example in the following but it may be a magnetic head of a so-called yoke type using a soft magnetic material as a part of the magnetic circuit. Namely, the present invention is not always limited to such an example.

Figure 7:
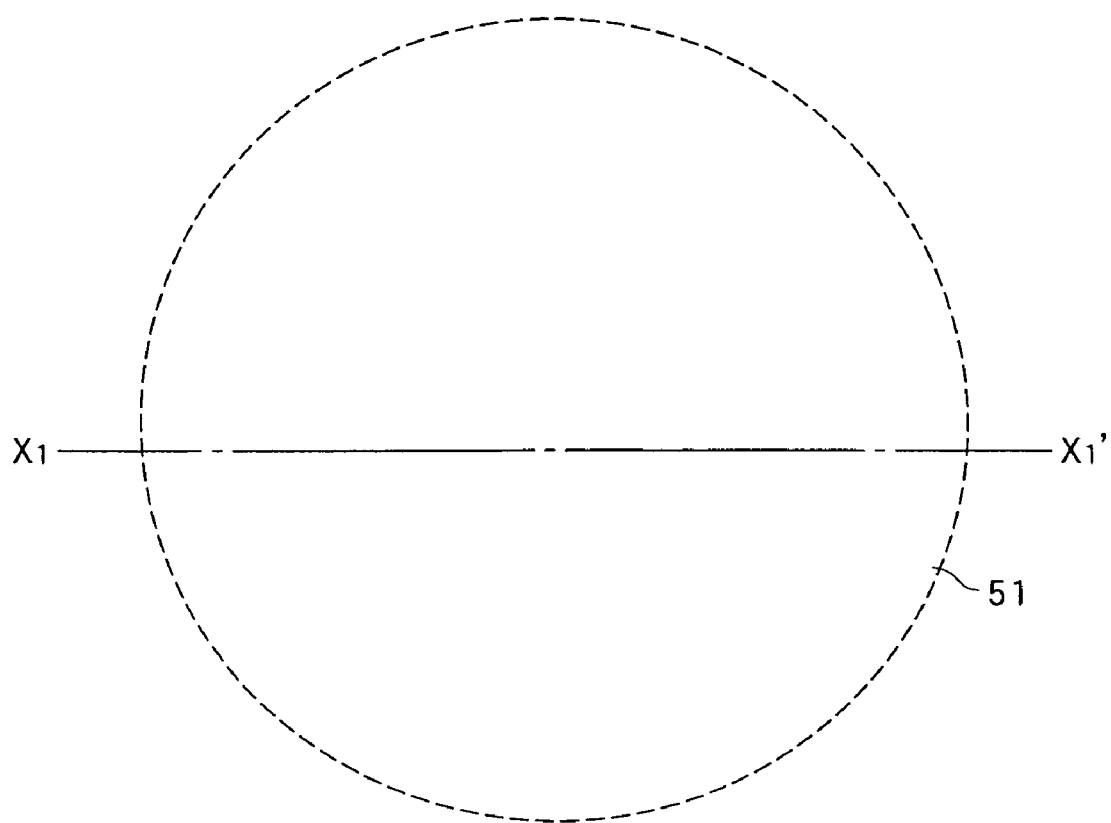
FIG. 7 is a schematic plan view of a first soft magnetic layer formed on a substrate in the process of head slider production.
Figure 8:
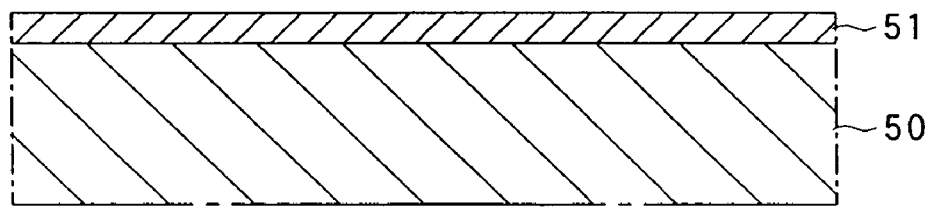
FIG. 8 is a schematic sectional view taken along the line $X_1$-$X_1'$ in FIG. 7

Referring now to FIGS. 7 and 8, there is illustrated a plan view of a first soft magnetic layer formed on a substrate in the process of head slider production. FIG. 7 is a schematic plan view of the first soft magnetic layer, and FIG. 8 is a schematic sectional view taken along the line $X_1$-$X_1'$ in FIG. 7. First in the production of the magnetic head 20, there is prepared a disc-like substrate 50 of about 4 inches in diameter for example, as shown in FIGS. 7 and 8. The surface of the substrate 50 is mirror-finished. Then, a first soft magnetic layer 51 which is to provide the upper shielding layer 24 is formed on the substrate 50 by sputtering or the like method.

The substrate 50 is to finally be the substrate 23 of the aforementioned magnetic had 20. After various component elements of the magnetic head 20 are formed one after another on the main side of the substrate 50 by the thin-film forming process, the substrate 50 is cut into individual head chips, whereby a plurality of head sliders 4 each having the magnetic head 20 mounted thereon can be produced collectively.

Note that the substrate 50 should preferably be formed from alumina titanum carbide ($Al_2O_3$—TiC) or the like. On the other hand, the first soft magnetic layer 51 is formed from an amorphous lamination layer of CoZrNbTa of 2.3 µm in thickness for example.

Figure 9:
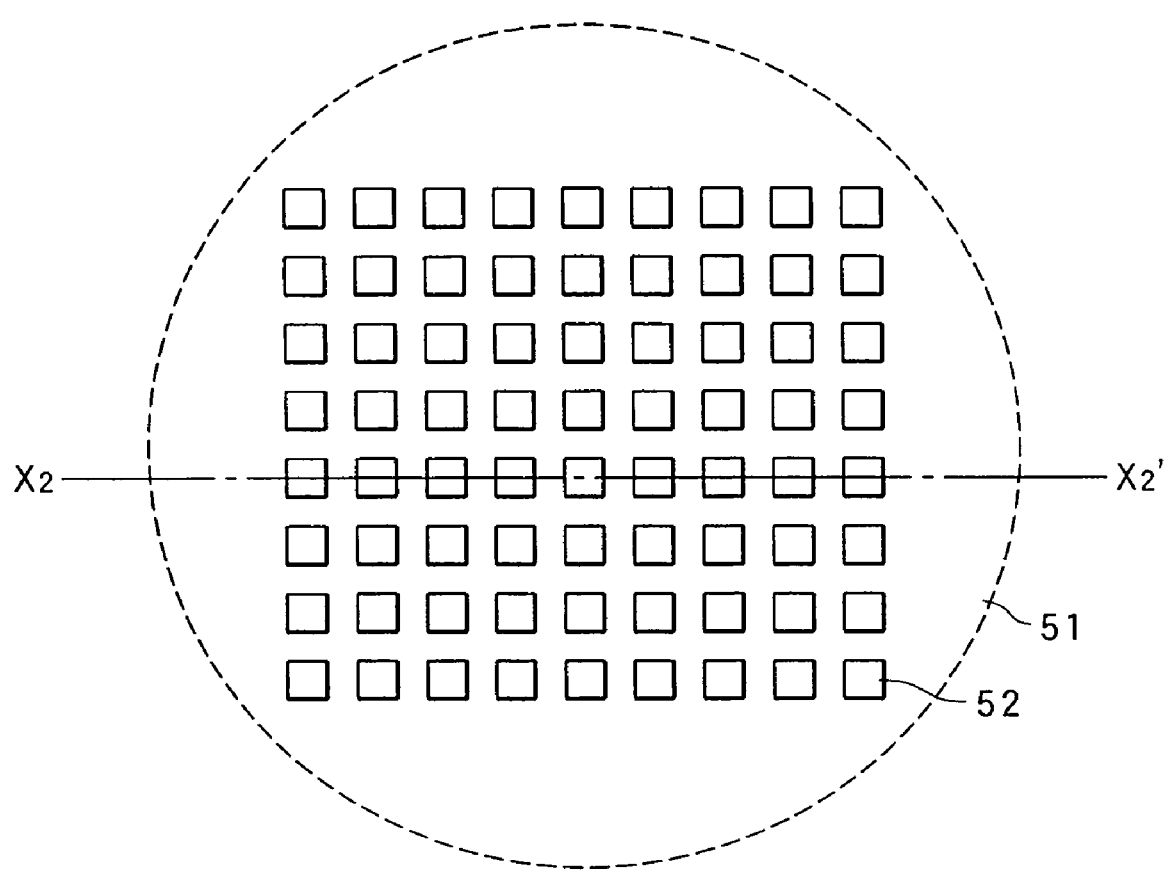
FIG. 9 is a schematic plan view of a first resist pattern formed on the first soft magnetic layer in the process of head slider production.
Figure 10:
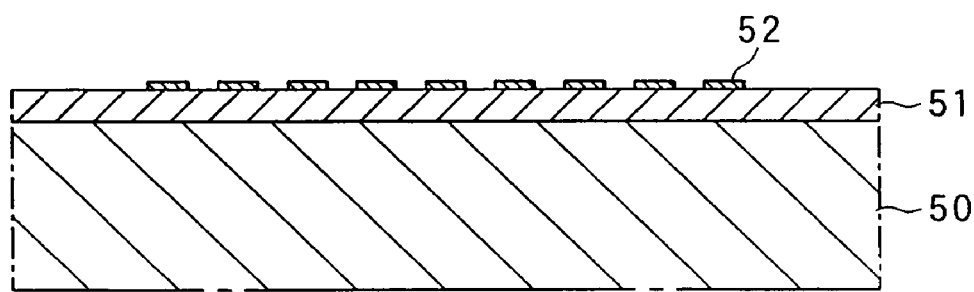
FIG. 10 is a schematic sectional view taken along the line $X_2$-$X_2'$ in FIG. 9

Next, referring to FIGS. 9 and 10, there is illustrated a first resist pattern formed on the first soft magnetic layer 51 in the process of head slider production. FIG. 9 is a schematic plan view of the first resist pattern and FIG. 10 is a schematic sectional view taken along the line $X_2$-$X_2'$ in FIG. 9. A photoresist is applied to the first soft magnetic layer 51 and cured to form a resist layer. The photolithography is utilized to pattern the resist layer to a predetermined form, thereby forming a first resist pattern 52 as shown in FIGS. 9 and 10. More specifically, for patterning the resist layer to have the predetermined pattern, first the resist layer is exposed correspondingly to a desired pattern. Next, the exposed portions of the resist layer are solved and removed in a developing solution, and then subjected to post-baking. Thus, a resist pattern of the predetermined form is provided.

Figure 11:
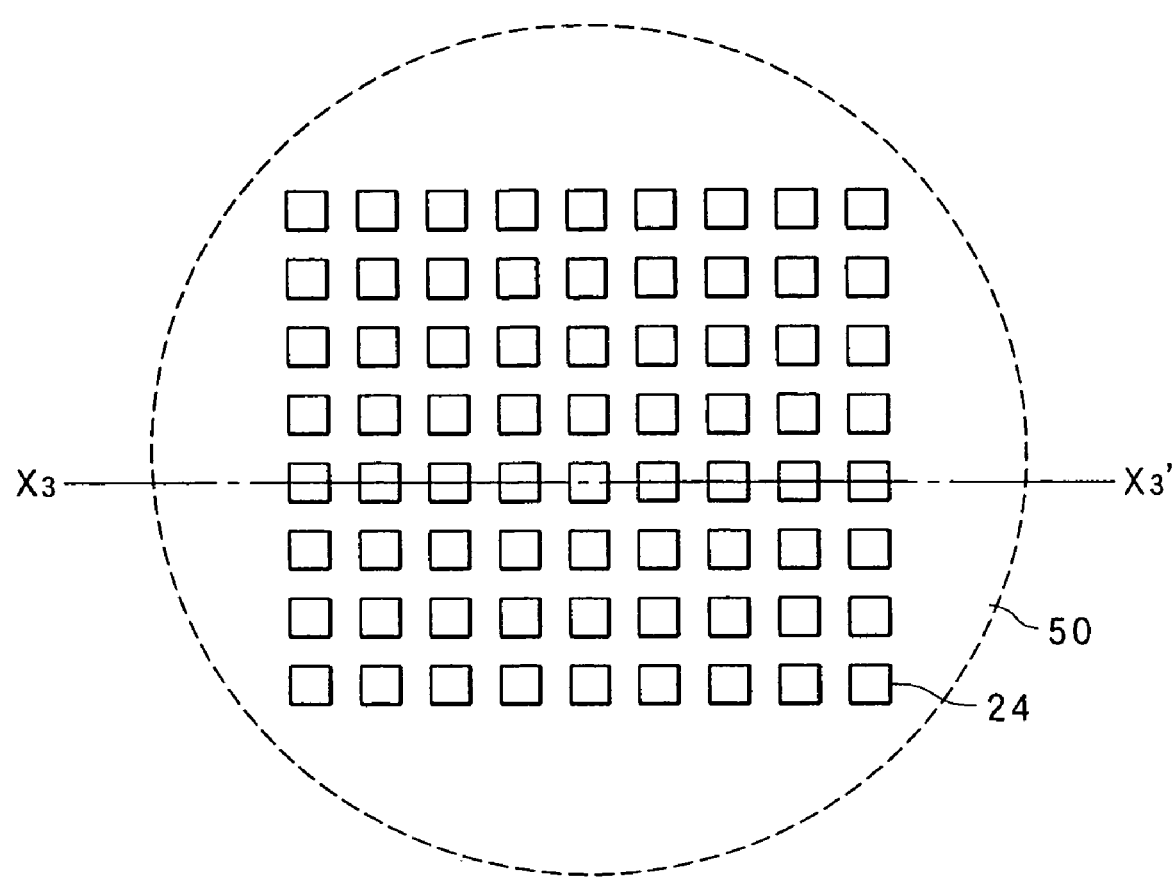
FIG. 11 is a schematic plan view of a lower shielding layer formed on the substrate in the process of head slider production.
Figure 12:
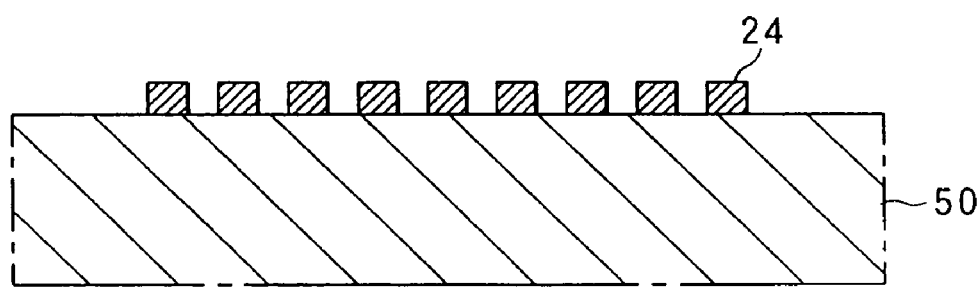
FIG. 12 is a schematic sectional view taken along the line $X_3$-$X_3'$ in FIG. 11.

Next, referring to FIGS. 11 and 12, there is illustrated the lower shielding layer 24 formed on the substrate 50 in the process of head slider production. FIG. 11 is a schematic plan view of the lower shielding layer 24 formed on the substrate 50 and FIG. 12 is a schematic sectional view taken along the line $X_3$-$X_3'$ in FIG. 11. Using the first resist pattern 52 as a mask, the first soft magnetic layer 51 is etched by dry etching, and then the first resist pattern is removed from on the first soft magnetic layer 51. Thus, a plurality of lower shielding layers 24 is formed as shown in FIGS. 11 and. 12. Note that the lower shielding layer 24 should be formed sufficiently large to magnetically shield the lower layer of the TMR element 26 which is to be formed in the later process.

Figure 13:
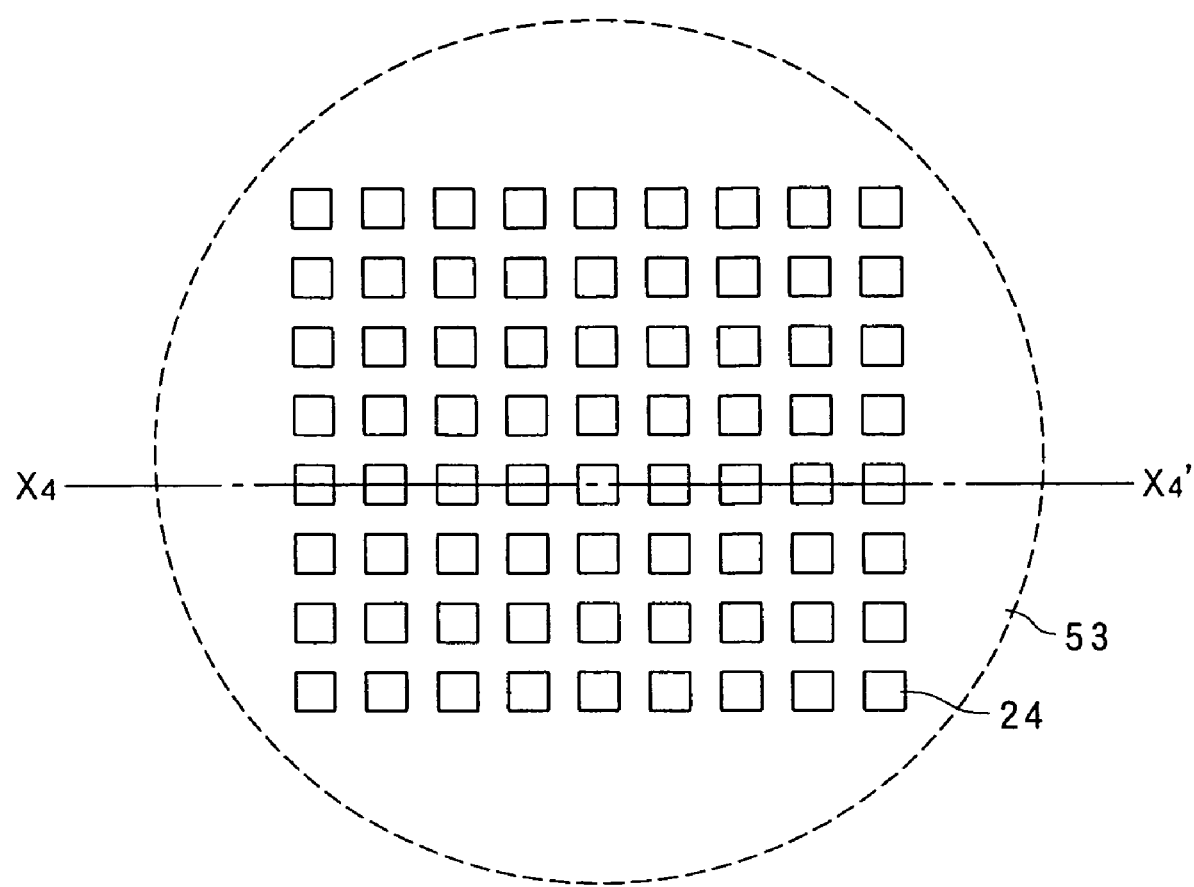
FIG. 13 is a schematic plan view of a first nonmagnetic nonconductive layer formed on the substrate and polished until the surface of the lower shielding layer is exposed, in the process of head slider production.
Figure 14:
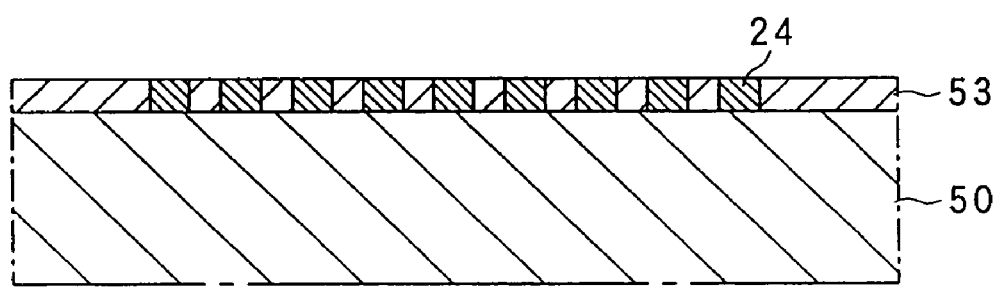
FIG. 14 is a schematic sectional view taken along the line $X_4$-$X_4'$ in FIG. 13.

Next, referring now to FIGS. 13 and 14, there is illustrated a first nonmagnetic nonconductive layer 54 formed on the substrate 50 and polished until the surface of the lower shielding layer 24 is exposed, in the process of head slider production. FIG. 13 is a schematic plan view of the first nonmagnetic nonconductive layer 54 formed on the substrate 50 and FIG. 14 is a schematic sectional view taken along the line $X_4$-$X_4'$ in FIG. 13. As shown, a first nonmagnetic nonconductive layer 53 is formed from $Al_2O_3$ for example by sputtering over the substrate 50, and then the layer 53 is polished until the plurality of lower shielding layers 24 formed on the substrate 50 is exposed. Thus, the first nonmagnetic nonconductive layer 53 is embedded between the substrate 50 and lower shielding layers 24 to provide a flat surface where the lower shielding layers are formed on the substrate 50.

Figure 15:
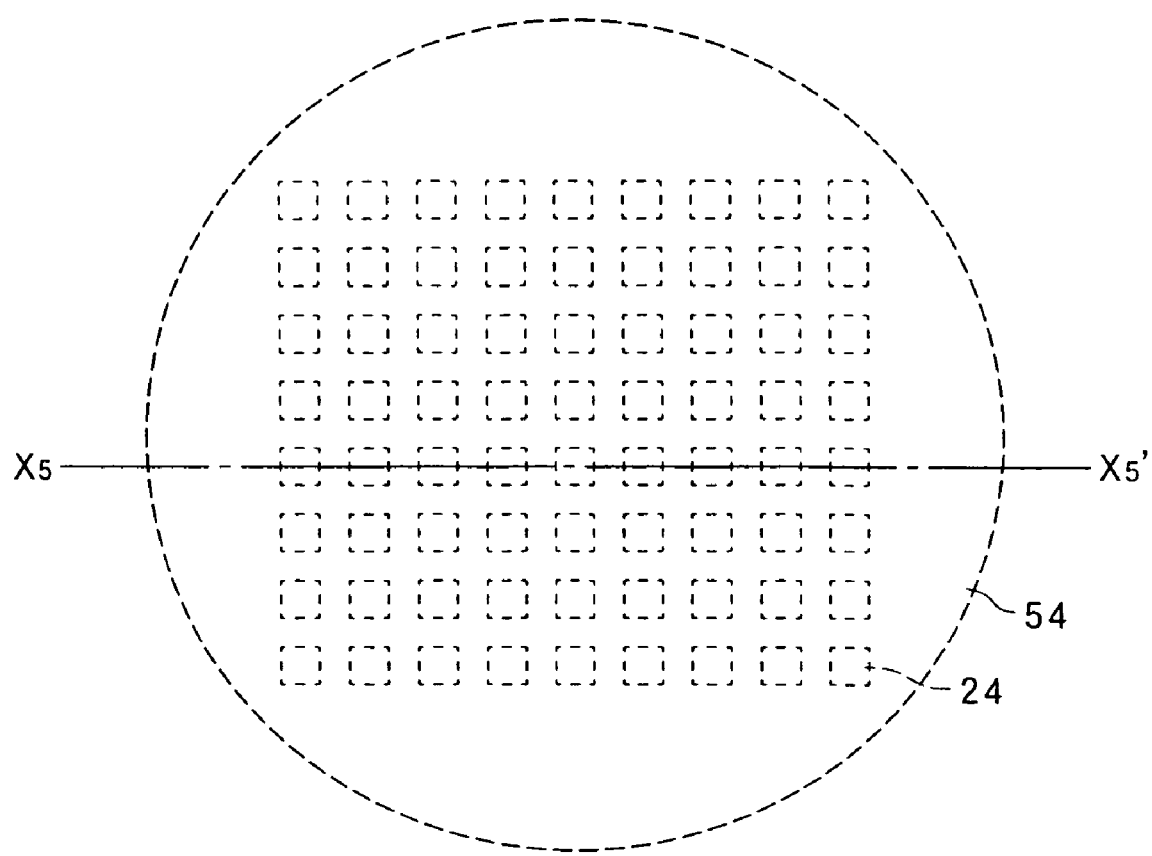
FIG. 15 is a schematic plan view of a first nonmagnetic conductive layer formed on the flattened substrate in the process of head slider production.
Figure 16:
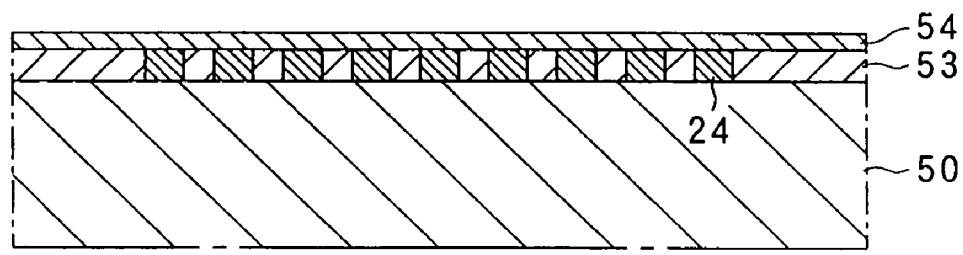
FIG. 16 is a schematic sectional view taken along the line $X_5$-$X_5'$ in FIG. 15.

Next, referring to FIGS. 15 and 16, there is illustrated the first nonmagnetic conductive layer 54 formed on the flattened substrate 50 in the process of head slider production. FIG. 15 is a schematic plan view of the first nonmagnetic conductive layer 54 formed on the flattened substrate 50 and FIG. 16 is a schematic sectional view taken along the line $X_5$-$X_5'$ in FIG. 15. At this step of the head slider production process, sputtering or the like method is utilized to form on the substrate 50 the first nonmagnetic conductive layer 54 which is to provide the lower nonmagnetic conductive layer 25 as shown. The first nonmagnetic conductive layer 54 is the previously mentioned nonmagnetic metal layer whose thickness may be set to an appropriate value correspondingly to the frequency etc. of a signal recorded in a magnetic recording medium. The thickness is about 100 nm for example.

Figure 17:
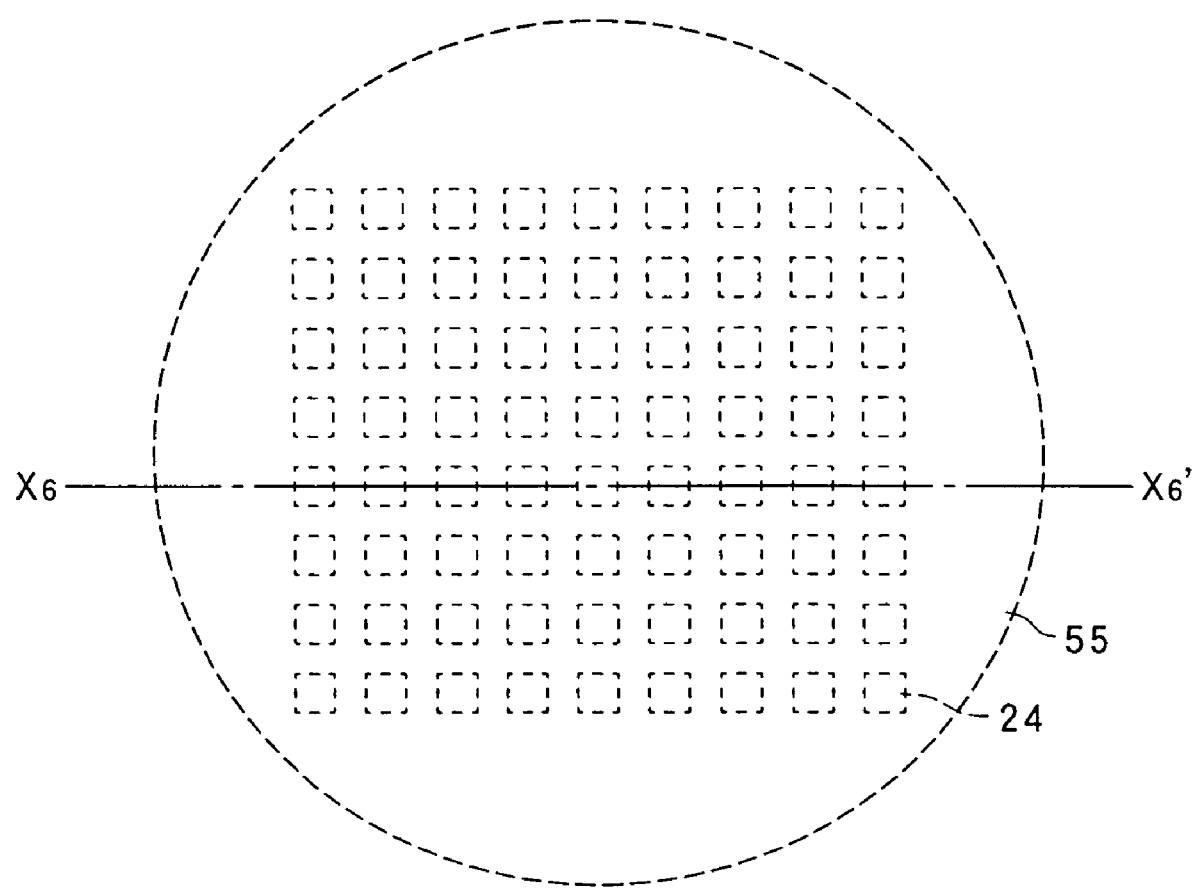
FIG. 17 is a schematic plan view of a magnetic tunnel junction layer formed on the first nonmagnetic conductive layer in the process of head slider production.
Figure 18:
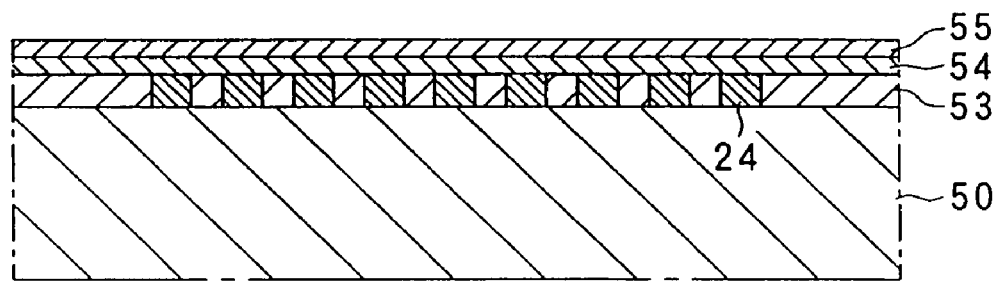
FIG. 18 is a schematic sectional view taken along the line $X_6$-$X_6'$ in FIG. 17.

Next, referring now to FIGS. 17 and 18, there is illustrated a magnetic tunnel junction layer 55 formed on the first nonmagnetic conductive layer 54 in the process of head slider production. FIG. 17 is a schematic plan view of the magnetic tunnel junction layer 55 formed on the first nonmagnetic conductive layer 54 and FIG. 18 is a schematic sectional view taken along the line $X_6$-$X_6'$ in FIG. 17. As shown, the magnetic tunnel junction layer 55 which is to provide the aforementioned magnetic tunnel junction layer 33 is formed by sputtering or the like on the first nonmagnetic conductive layer 54.

As will be seen, the magnetic tunnel junction layer 55 is formed, by sputtering or the like, from a lamination of a Ta layer of 3 nm in thickness as a lower layer, a NiFe layer of 3 nm as the fixed-magnetization layer 30, an IrMn layer of 10 nm and CoFe layer of 4 nm, an aluminum oxide ($Al_2O_3$) layer of 1.3 nm as the tunnel barrier layer 32, a CoFe layer of 4 nm and NiFe layer of 5 nm as the free-magnetization layer 31, and a Ta layer of about 5 nm in thickness as an upper layer, laminated one on the other in this order.

Note that the materials and thickness of the layers composing together the above magnetic tunnel junction layer 55 are not limited to the above ones but may be properly selected correspondingly to the purpose of use of the TMR element 26.

Figure 19:
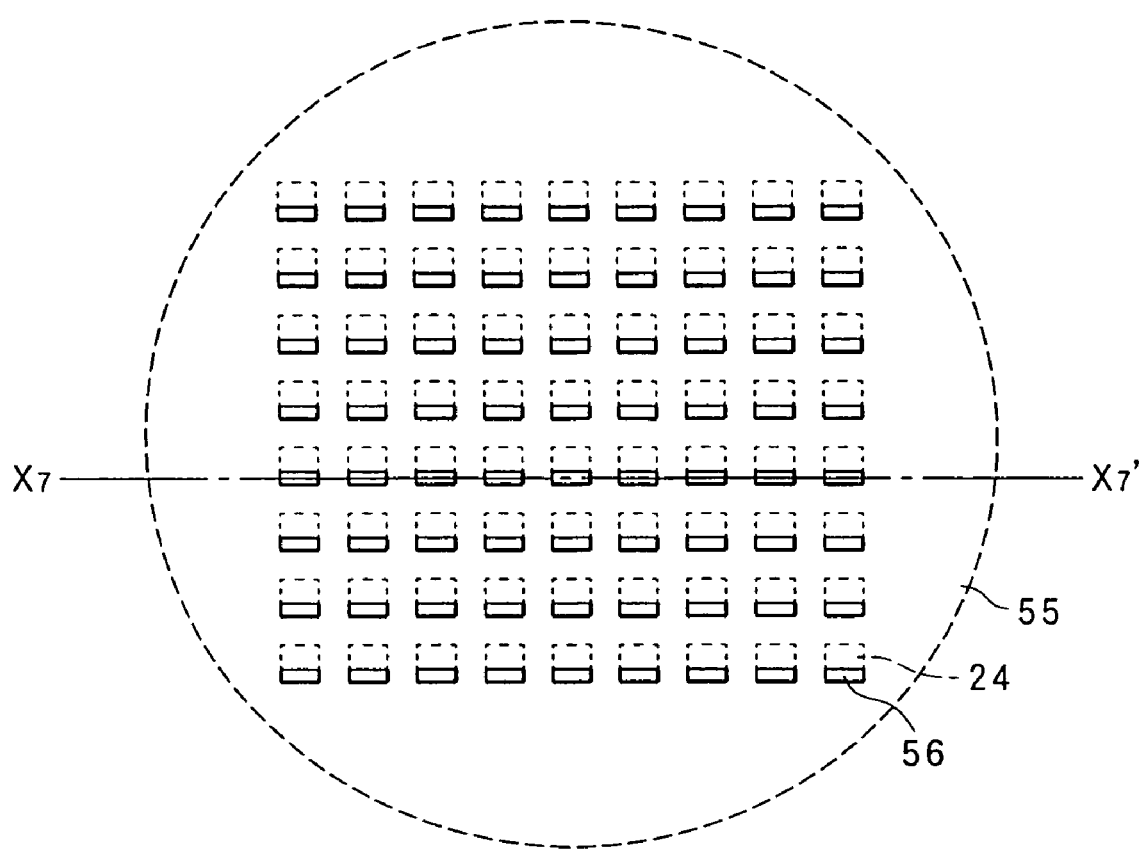
FIG. 19 is a schematic plan view of a second resist pattern formed on the magnetic tunnel junction layer in the process of head slider production.
Figure 20:
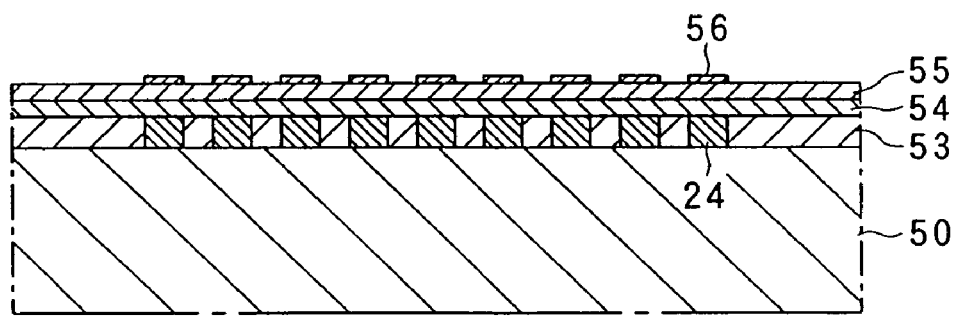
FIG. 20 is a schematic sectional view taken along the line $X_7$-$X_7'$ in FIG. 19.

Next, referring to FIGS. 19 and 20, there is illustrated a second resist pattern 56 formed on the magnetic tunnel junction layer 55 in the process of head slider production. FIG. 19 is a schematic plan view of the second resist pattern formed on the magnetic tunnel junction layer 55 and FIG. 20 is a schematic sectional view taken along the line $X_7$-$X_7'$ in FIG. 19. A photoresist is applied to the magnetic tunnel junction layer 55 and cured to form a resist layer. Then, the photolithography is utilized to pattern the resist layer to a predetermined form, thereby forming the second resist pattern 56 as shown.

Figure 21:
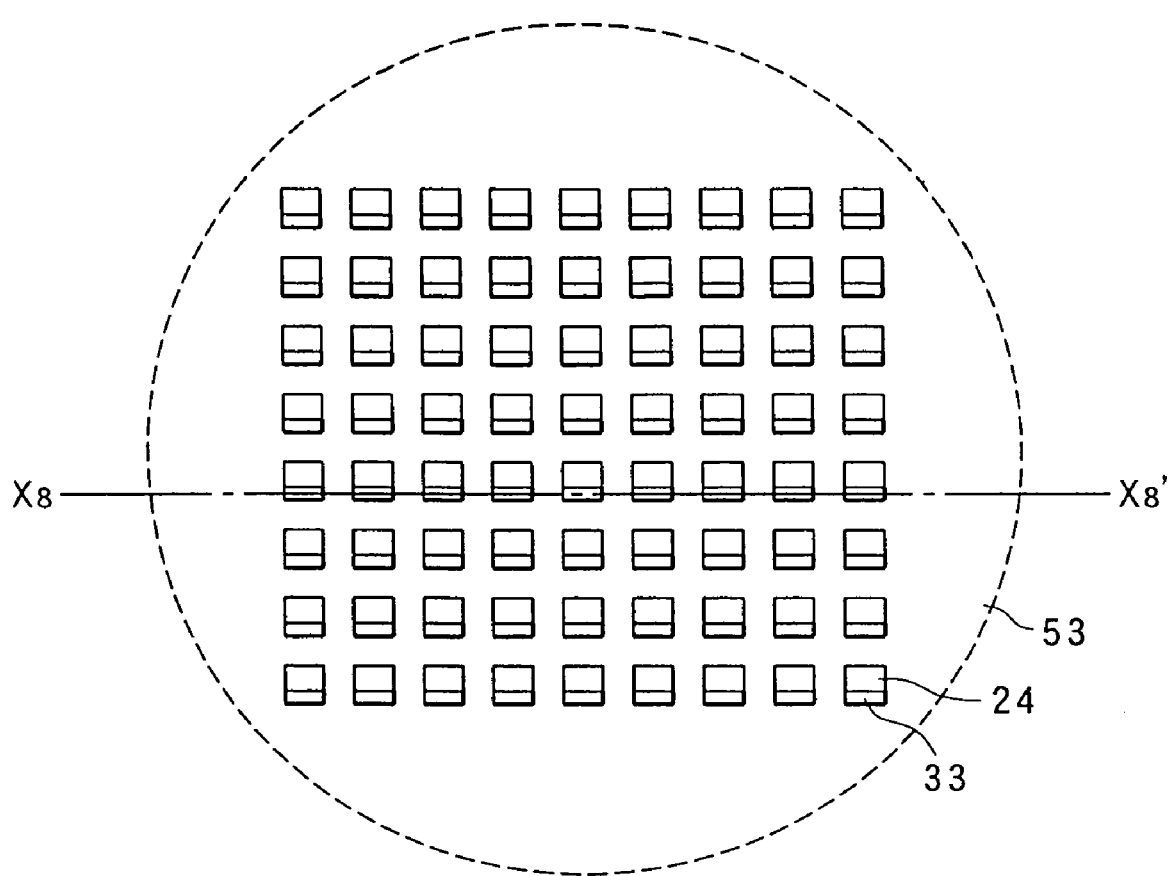
FIG. 21 is a schematic plan view of a lower nonmagnetic conductive layer and magnetic tunnel junction layer formed on the lower shielding layer in the process of head slider production.
Figure 22:
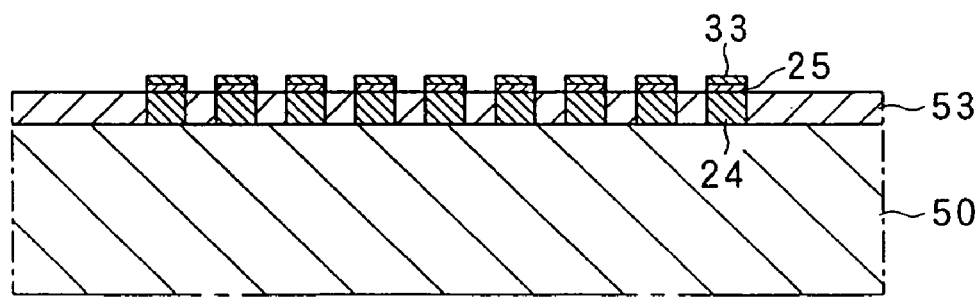
FIG. 22 is a schematic sectional view taken along the line $X_8$-$X_8'$ in FIG. 21.

Next, referring to FIGS. 21 and 22, there is illustrated the lower nonmagnetic conductive layer 25 and magnetic tunnel junction layer 55 formed on the lower shielding layer 24 in the process of head slider production. FIG. 21 is a schematic plan view of the lower nonmagnetic conductive layer 25 and magnetic tunnel junction layer 55 formed on the lower shielding layer 24 and FIG. 22 is a schematic sectional view taken along the line $X_8$-$X_8'$ in FIG. 21. As shown, the second resist pattern 56 is used as a mask to etch the magnetic tunnel junction layer 55 and first nonmagnetic conductive layer 54 and then the second resist pattern 56 is removed. Thus, there is formed on the lower shielding layer 24 the lower nonmagnetic conductive layer 25 and magnetic tunnel junction layer 33, having the predetermined form.

Figure 23:
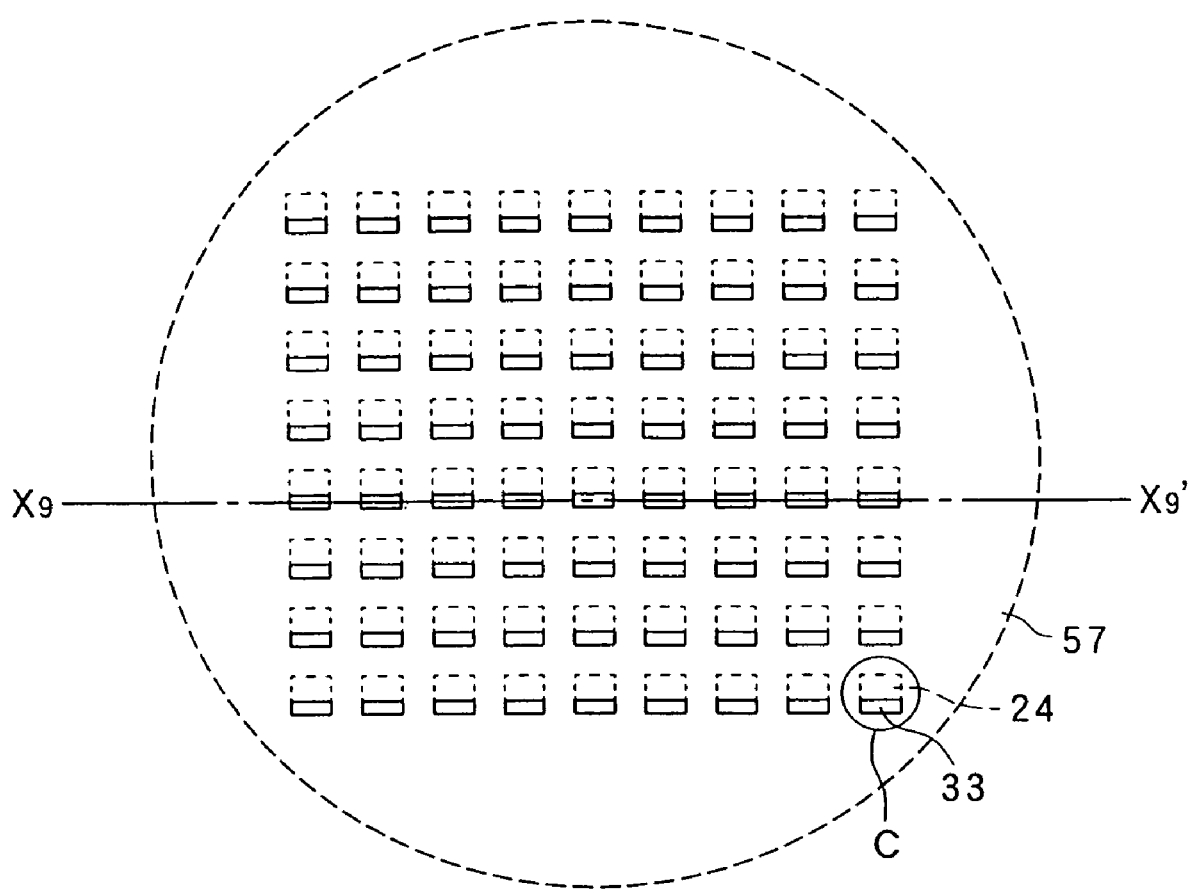
FIG. 23 is a schematic plan view of a second nonmagnetic conductive layer and magnetic tunnel junction layer formed on the substrate and polished until the surface of the magnetic tunnel junction layer is exposed, in the process of head slider production
Figure 24:
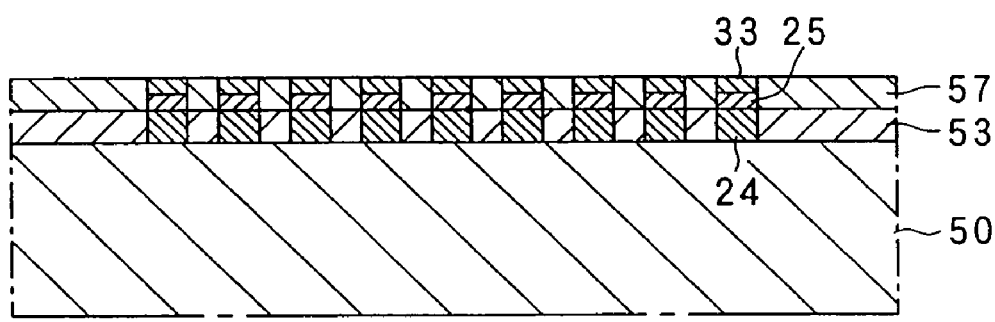
FIG. 24 is a schematic sectional view taken along the line $X_9$-$X_9'$ in FIG. 23.

Next, referring to FIGS. 23 and 24, there is illustrated a second nonmagnetic nonconductive layer 57 and magnetic tunnel junction layers 33 formed on the substrate 50 and polished until the surface of the magnetic tunnel junction layer 33 is exposed, in the process of head slider production. FIG. 23 is a schematic plan view of the second nonmagnetic nonconductive layer 57 and magnetic tunnel junction layers 33 formed on the substrate 50 and polished until the surface of the magnetic tunnel junction layer 33 is exposed, and FIG. 24 is a schematic sectional view taken along the line $X_9$-$X_9'$ in FIG. 23. As shown, sputtering or the like is used to form the second nonmagnetic nonconductive layer 57 of $Al_2O_3$ for example over the substrate 50, and then the second magnetic nonconductive layer 57 is polished until the plurality of magnetic tunnel junction layers 33 formed on the substrate 50 is exposed. Thus, the second nonmagnetic nonconductive layer 57 is embedded between the substrate 50 and lower nonmagnetic conductive layer 25 and magnetic tunnel junction layers 33 to provide a flat surface where the lower nonmagnetic conductive layer 25 and magnetic tunnel junction layers 33 are not formed on the substrate 50.

Figure 25:
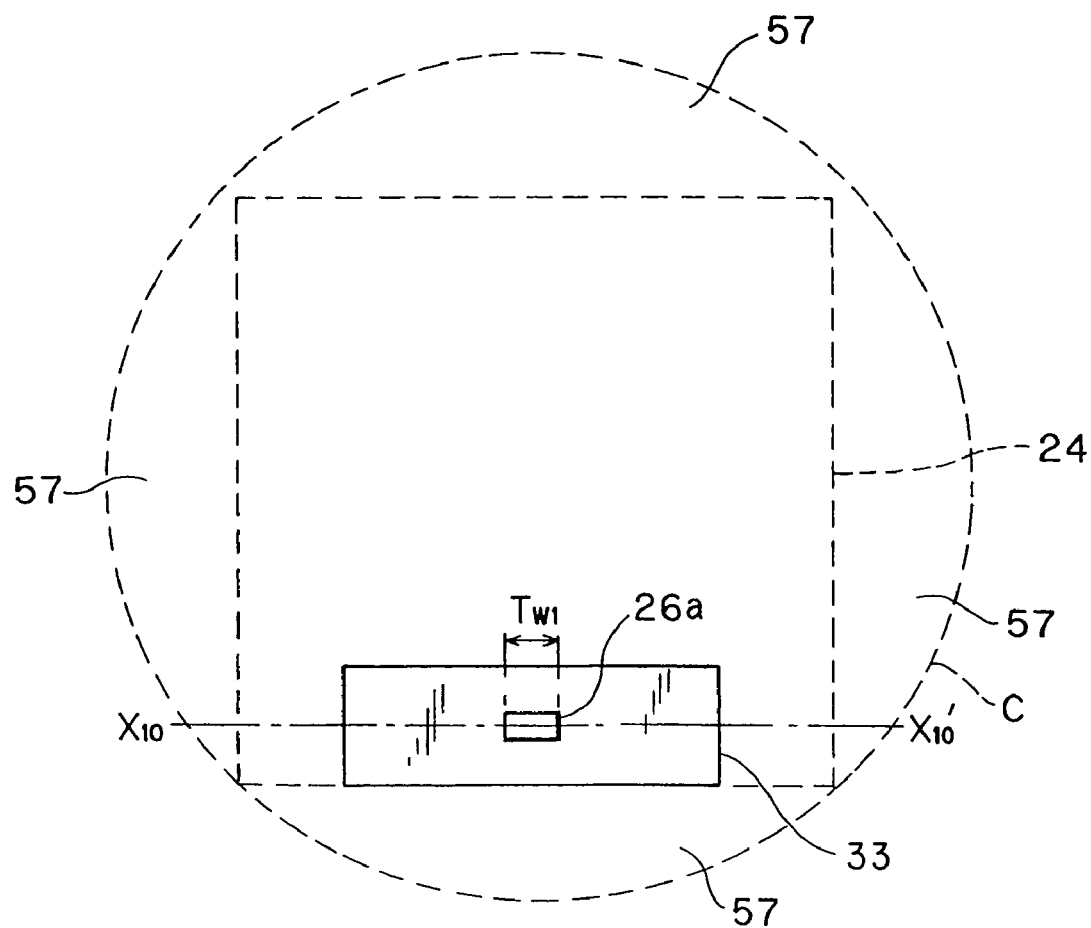
FIG. 25 is a schematic plan view of a recess formed around a portion of the magnetic tunnel junction layer which is to be a magnetic sensor of the TMR element in the process of head slider production.
Figure 26:
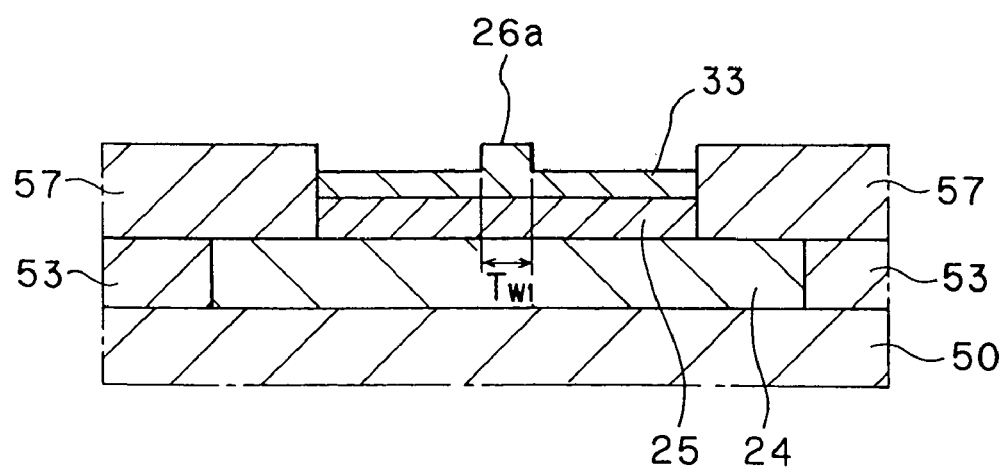
FIG. 26 is a schematic sectional view taken along the line $X_{10}$-$X_{10}'$ in FIG. 25.

Next, referring to FIGS. 25 and 26, there is illustrated a recess formed around a portion of the magnetic tunnel junction layer 33 which is to be the magnetic sensor 26a of the TMR element 26 in the process of head slider production. FIG. 25 is a schematic plan view, enlarged in scale, a portion C shown in FIG. 23, and FIG. 26 is a schematic sectional view taken along the line $X_{10}$-$X_{10}'$ in FIG. 25. As shown, a photoresist is applied to the flattened substrate 50 and cured to form a resist layer. The photolithography is utilized to pattern the resist layer to a predetermined form. Then, the patterned resist layer is used as a mask to etch, by ion etching, the magnetic tunnel junction layer 33 in a range from the free-magnetization layer 31 to the middle of the fixed-magnetization layer 30 except for a portion of the layer 33 which is to be the magnetic sensor 26a of the TMR element 26. Thereafter, the resist layer is removed from on the substrate 50. Thus, the track width $Tw_1$ of the TMR element 26 relative to the magnetic disc 3 is defined. Note that the track width $Tw_1$ is about 5 μm in this embodiment but it is not limited to this value. The track width $Tw_1$ may be set to an appropriate value according to the system requirement.

Figure 27:
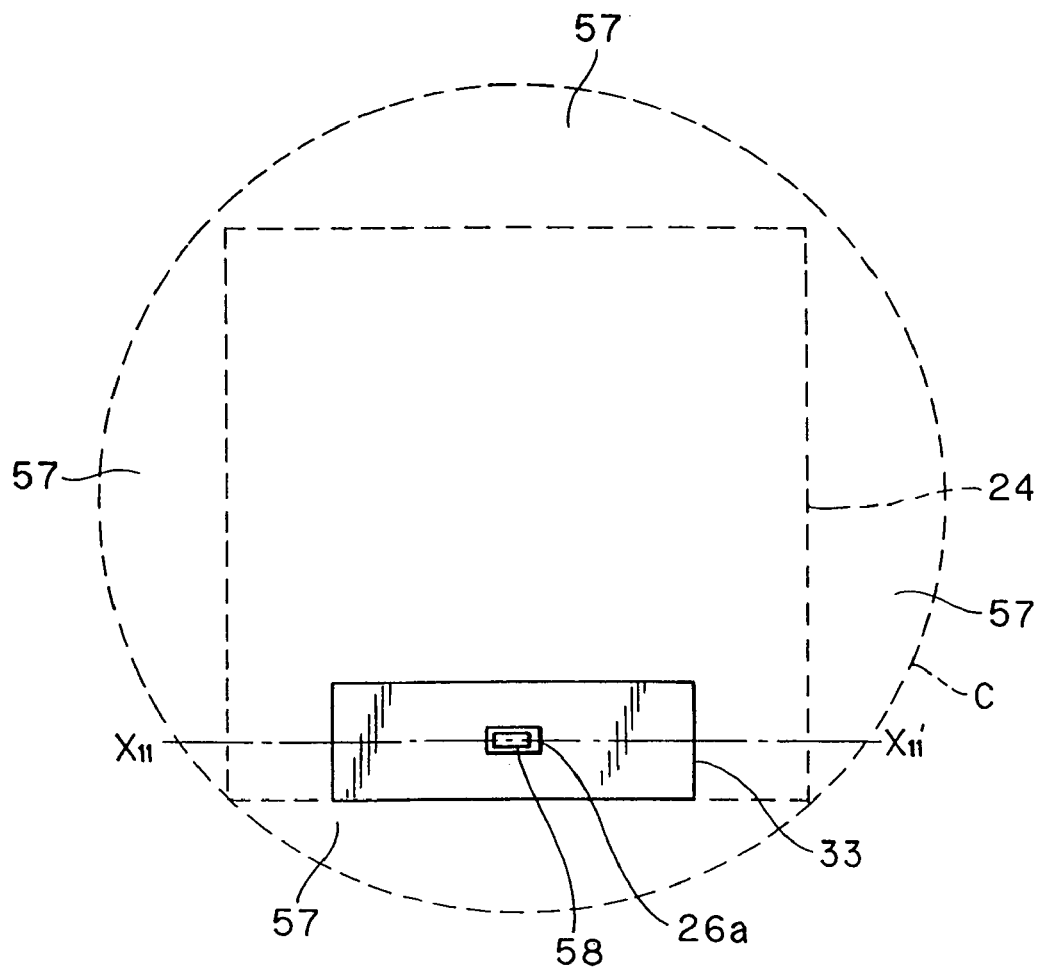
FIG. 27 is a schematic plan view of a third resist pattern formed right above the magnetic sensor of the TMR element in the process of head slider production.
Figure 28:
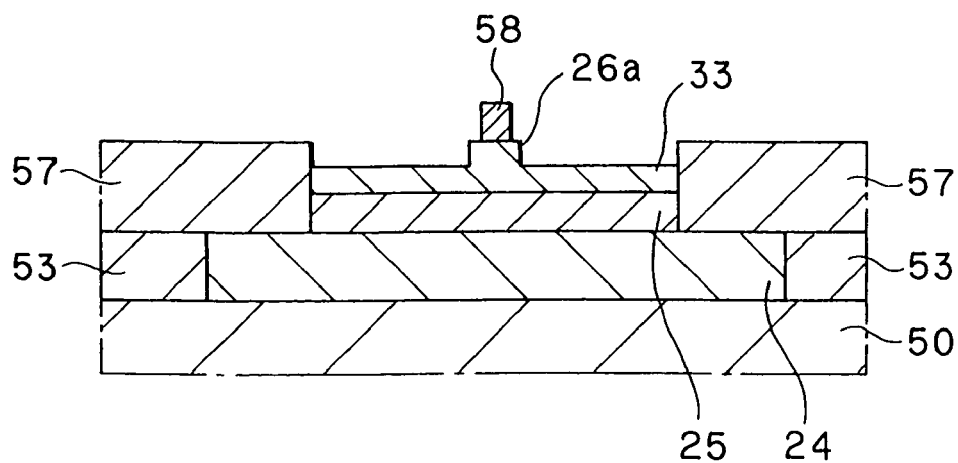
FIG. 28 is a schematic sectional view taken along the line $X_{11}$-$X_{11}'$ in FIG. 27.

Next, referring to FIGS. 27 and 28, there is illustrated a third resist pattern 58 formed right above the magnetic sensor 26a of the TMR element 26 in the process of head slider production. FIG. 27 is a schematic plan view, enlarged in scale, of the portion C in FIG. 23 and FIG. 28 is a schematic sectional view taken along the line $X_{11}$-$X_{11}'$ in FIG. 27. A photoresist is applied to the substrate 50 and cured to form a resist layer. The photolithography is utilized to pattern the resist layer to a predetermined form, thereby forming the third resist pattern 58 right above the magnetic sensor 26a of the TMR element 26 as shown in FIGS. 27 and 28.

Figure 29:
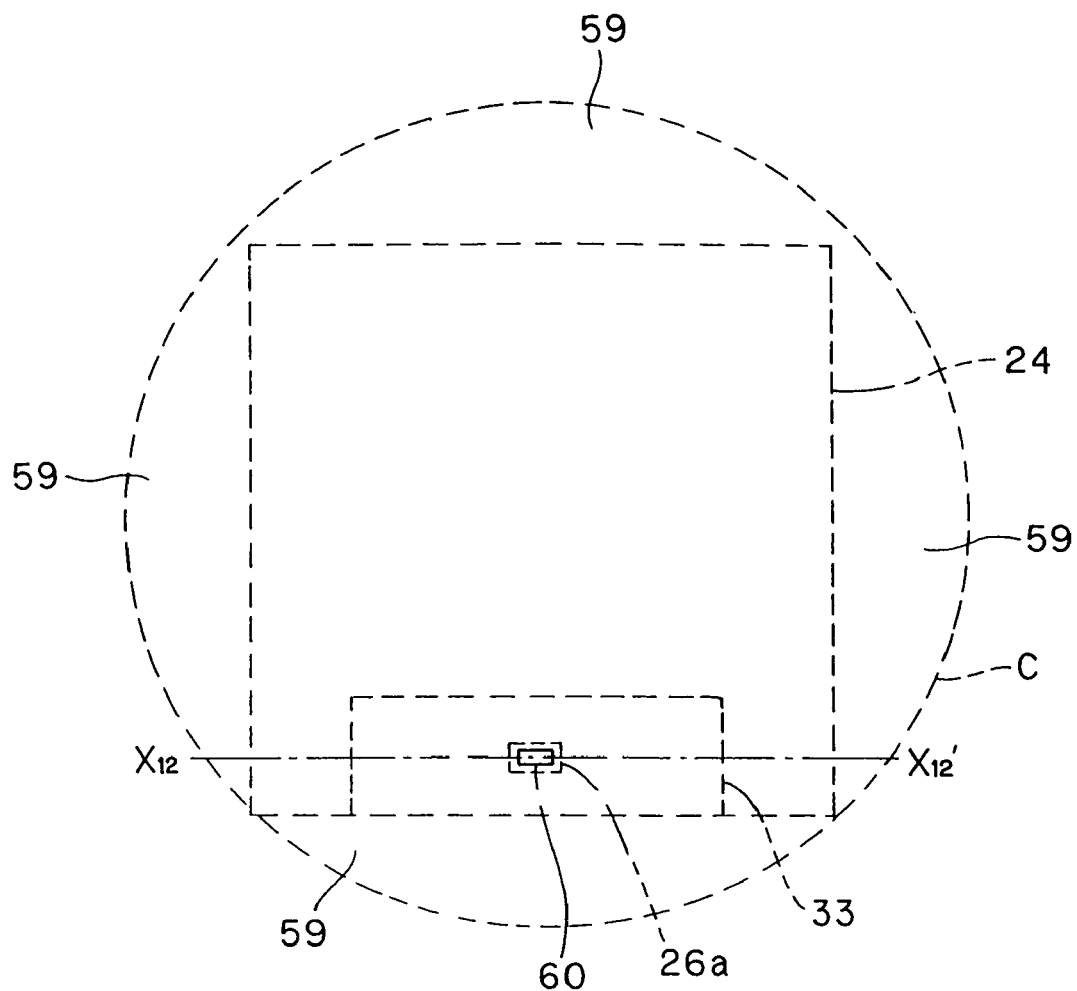
FIG. 29 is a schematic plan view of a third nonmagnetic nonconductive layer having a contact hole, formed right above the magnetic sensor of the TMR element in the process of head slider production.
Figure 30:
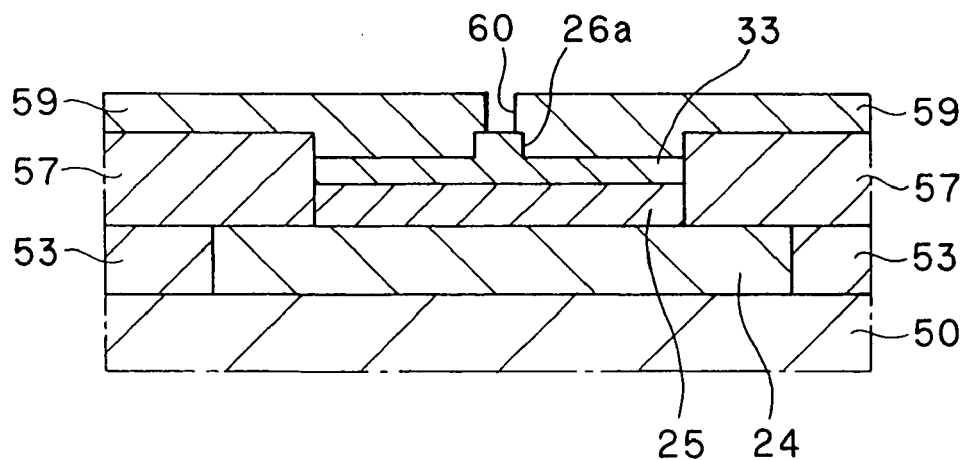
FIG. 30 is a schematic sectional view taken along the line $X_{12}$-$X_{12}'$ in FIG. 29.

Next, referring to FIGS. 29 and 30, there is illustrated a third nonmagnetic nonconductive layer having a contact hole, formed right above the magnetic sensor 26a of the TMR element 26 in the process of head slider production. FIG. 29 is a schematic plan view, enlarged in scale, of the portion C shown in FIG. 23 and FIG. 30 is a schematic sectional view taken along the line $X_{12}$-$X_{12}'$ in FIG. 29. The third resist pattern 58 is used to form, by sputtering or the like, a third nonmagnetic nonconductive layer 59 of $Al_2O_3$ for example, and then the third resist pattern 58 is removed along with the third nonmagnetic nonconductive layer 59 on the third resist layer 58, whereby there is formed the third nonmagnetic nonconductive layer 59 having a contact hole 60 open right above the magnetic sensor 26a of the TMR element 26.

Figure 31:
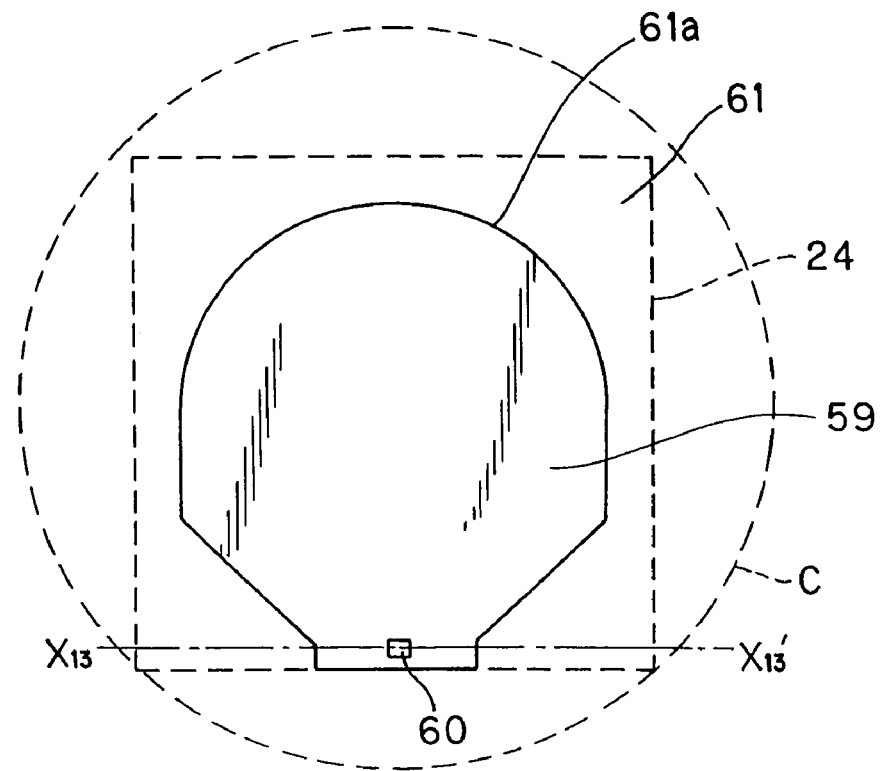
FIG. 31 is a schematic plan view of a fourth resist pattern formed on the third nonmagnetic nonconductive layer in the process of head slider production.
Figure 32:
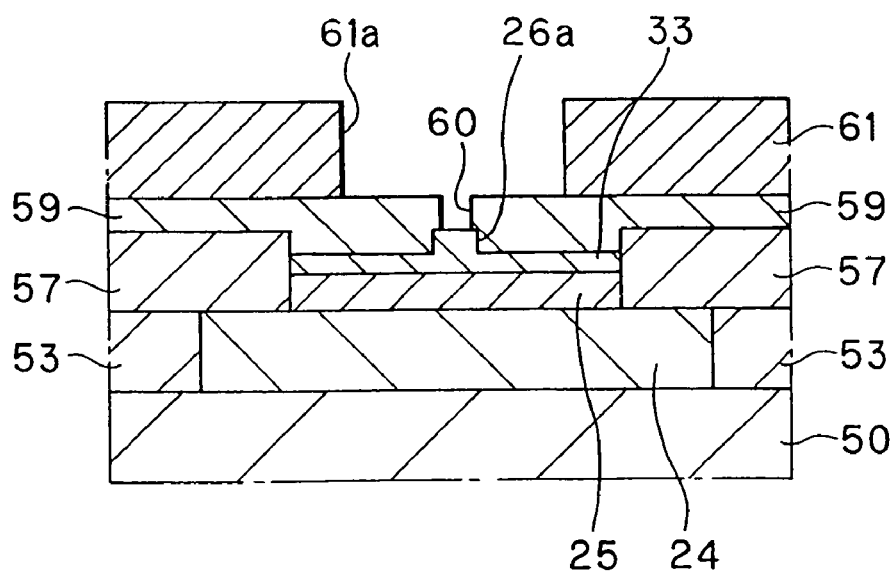
FIG. 32 is a schematic sectional view taken along the line $X_{13}$-$X_{13}'$ in FIG. 31.

Next, referring to FIGS. 31 and 32, there is illustrated a fourth resist pattern formed on the third nonmagnetic nonconductive layer 59 in the process of head slider production. FIG. 31 is a schematic plan view, enlarged in scale of the portion C shown in FIG. 23, and FIG. 32 is a schematic sectional view taken along the line $X_{13}$-$X_{13}'$ in FIG. 31. As shown, a photoresist is applied to the third nonmagnetic nonconductive layer 59 and cured to form a resist layer. The photolithography is utilized to pattern the resist layer to a predetermined form, thereby forming a fourth resist pattern 61 having an opening 61a having a predetermined form as shown in FIGS. 31 and 32.

Figure 33:
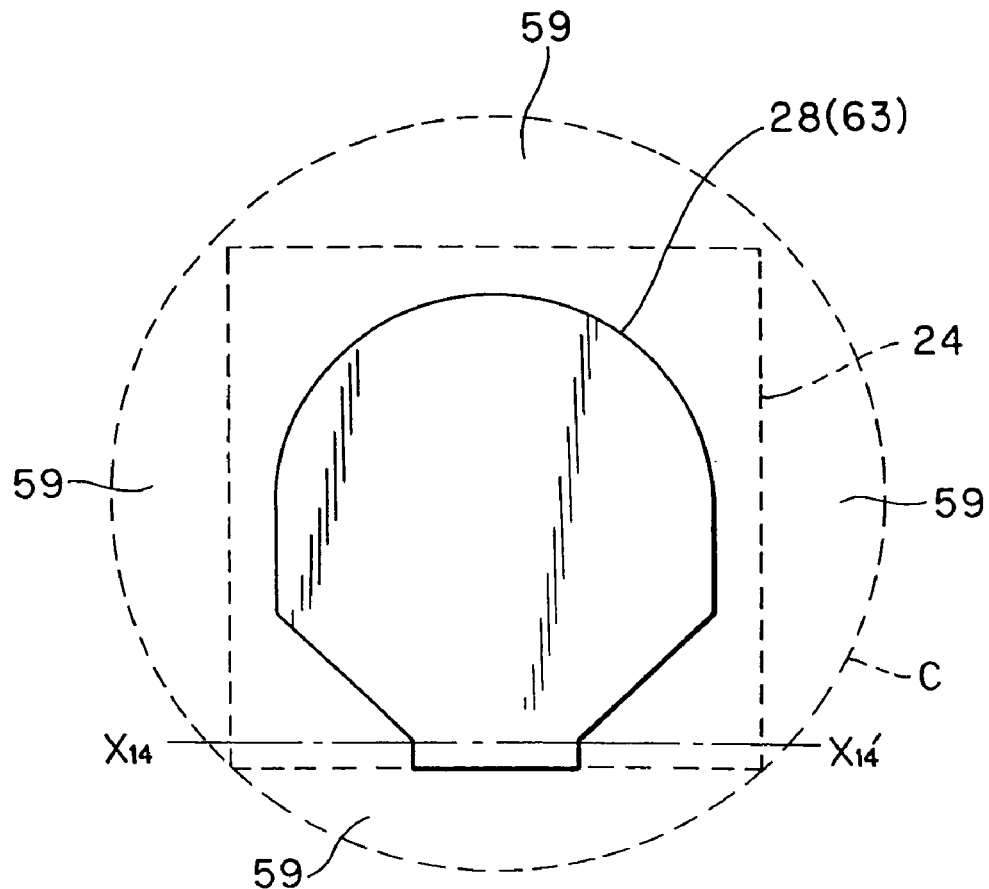
FIG. 33 is a schematic plan view of an upper nonmagnetic conductive layer and upper shielding layer formed on the third nonmagnetic conductive layer in the process of head slider production.
Figure 34:
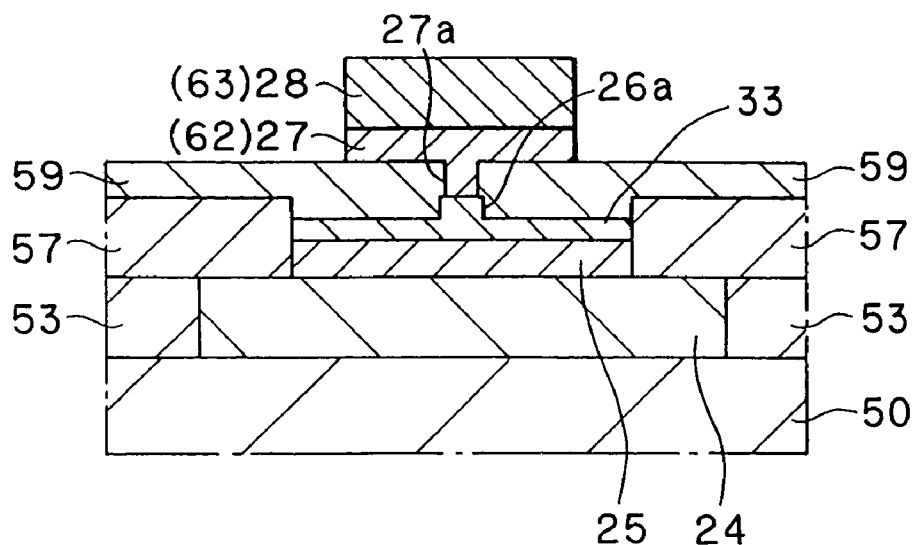
FIG. 34 is a schematic sectional view taken along the line $X_{14}$-$X_{14}'$ in FIG. 33.

Next, referring to FIGS. 33 and 34, there is illustrated an upper nonmagnetic conductive layer and upper shielding layer 28 formed on the third nonmagnetic conductive layer 59 in the process of head slider production. FIG. 33 is a schematic plan view, enlarged in scale, of the portion C shown in FIG. 23, and FIG. 34 is a schematic sectional view taken along the line $X_{14}$-$X_{14}'$ in FIG. 33. As shown, the fourth resist pattern 61 is used to form, by sputtering or the like, a second nonmagnetic conductive layer 62 which is to provide the upper nonmagnetic conductive layer 27. At this time, the second nonmagnetic conductive layer 62 will be embedded in the contact hole 60 in the third nonmagnetic nonconductive layer 59. Thus, the projection 27a of the upper nonmagnetic conductive layer 27, which is to abut the magnetic sensor 26a of the TMR element 26, is formed. Note that the second nonmagnetic conductive layer 62 is formed from the aforementioned magnetic metal layer whose thickness may be set to an appropriate value correspondingly to the frequency etc. of a signal recorded in a magnetic recording medium.

Then, sputtering or the like is used to form, on the second nonmagnetic conductive layer 62, a second soft magnetic layer 63 which is to provide the upper shielding layer 28 and lower core layer 36. The second soft magnetic layer 63 is formed from an amorphous lamination layer of CoZrNbTa of 2.3 μm for example. Note that the second soft magnetic layer 63 may be formed from other than the amorphous lamination layer and it may be formed by the use of any other method than the sputtering such as plating or evaporation for example.

Then, the fourth resist pattern 61 is removed along with the second nonmagnetic conductive layer 62 and second soft magnetic layer 63 formed on the fourth resist pattern 61. Thus, there are formed on the third nonmagnetic nonconductive layer 59 the upper nonmagnetic conductive layer 27 and upper shielding layer 28.

Figure 35:
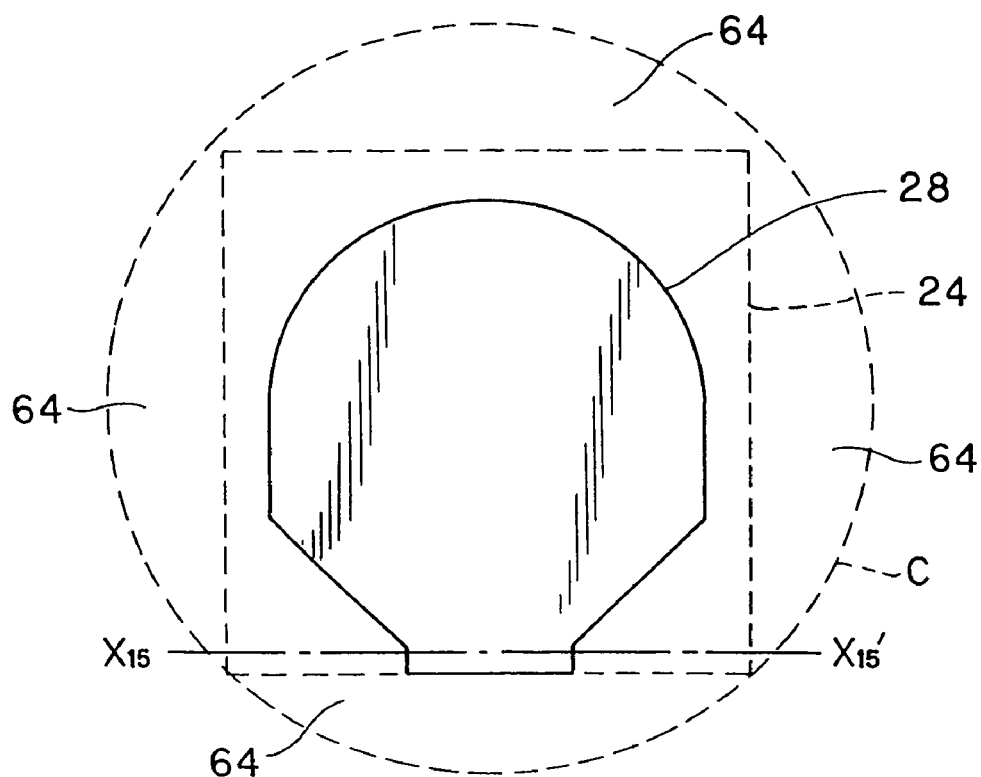
FIG. 35 is a schematic plan view of a fourth nonmagnetic nonconductive layer formed on the substrate and polished until the surface of the upper shielding layer is exposed, in the process of head slider production.
Figure 36:
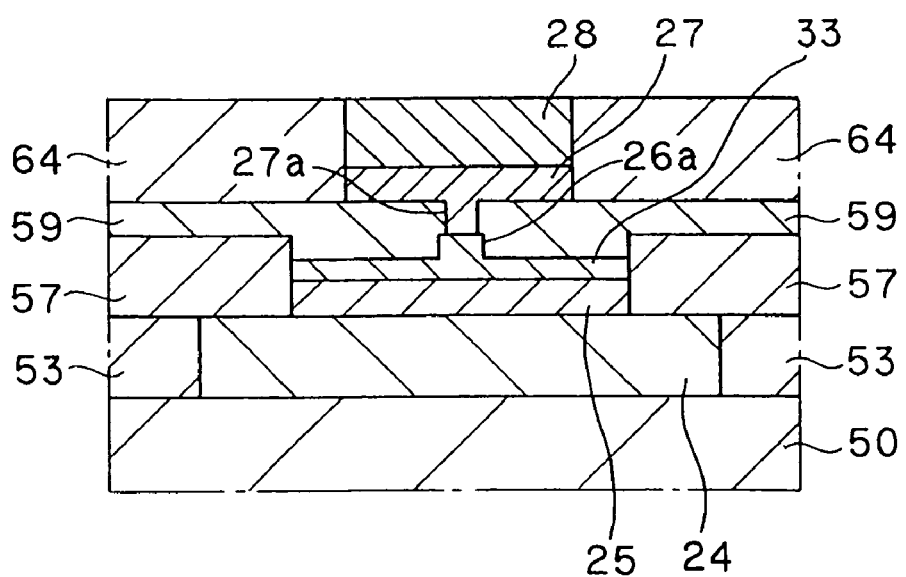
FIG. 36 is a schematic sectional view taken along the line $X_{15}$-$X_{15}'$ in FIG. 35.

Next, referring to FIGS. 35 and 36, there is illustrated a fourth nonmagnetic nonconductive layer 64 formed on the substrate 50 and polished until the surface of the upper shielding layer 28 is exposed, in the process of head slider production. FIG. 35 is a schematic plan view, enlarged in scale, of the portion C shown in FIG. 23, and FIG. 36 is a schematic sectional view taken along the line $X_{15}$-$X_{15}'$ in FIG. 35. The second nonmagnetic nonconductive layer 64 of $Al_2O_3$ for example is formed by sputtering or the like over the substrate 50, and then polished until the plurality of upper shielding layers 28 formed on the substrate 50 is exposed. Thus, the fourth nonmagnetic nonconductive layer 64 is embedded between the substrate 50 and upper shielding layers 28 to provide a flat surface where the upper shielding layers 28 are not formed on the substrate 50.

Figure 37:
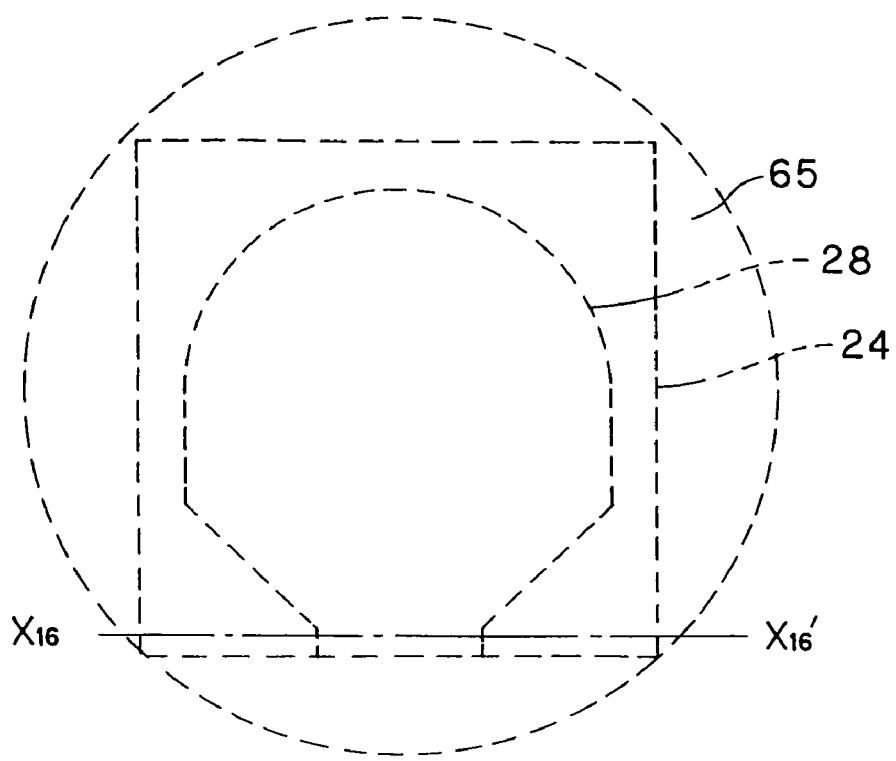
FIG. 37 is a schematic plan view of a fifth nonmagnetic nonconductive layer formed on the flattened substrate in the process of head slider production.
Figure 38:
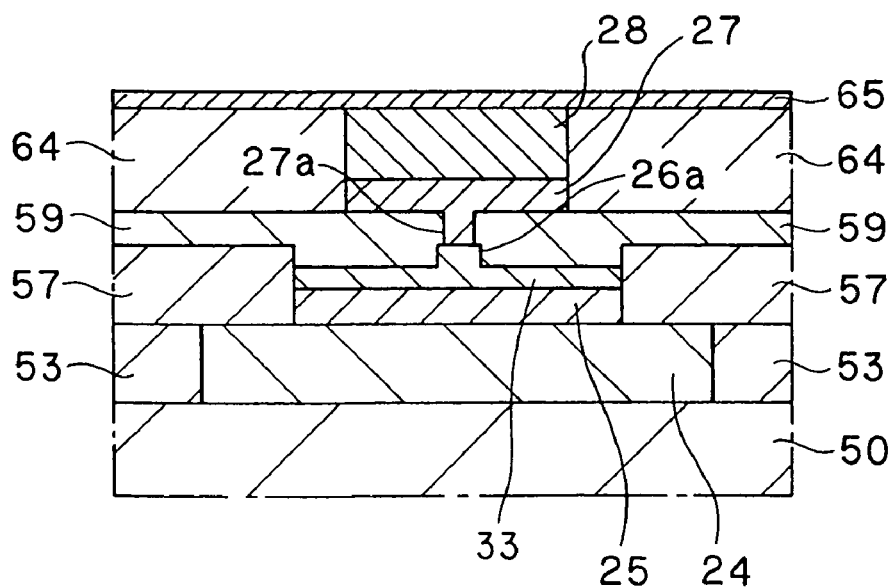
FIG. 38 is a schematic sectional view taken along the line $X_{16}$-$X_{16}'$ in FIG. 37.

Next, referring to FIGS. 37 and 38, there is illustrated a fifth nonmagnetic nonconductive layer 65 formed on the flattened substrate 50 in the process of head slider production. FIG. 37 is a schematic plan view, enlarged in scale, of the portion C shown in FIG. 23, and FIG. 38 is a schematic sectional view taken along the line $X_{16}$-$X_{16}'$ in FIG. 37. As shown, the fifth nonmagnetic nonconductive layer 65 which is to provide the magnetic gap 37 is formed by sputtering or the like on the flattened substrate 50. The fifth nonmagnetic nonconductive layer 65 should preferably be formed from $Al_2O_3$ or the like.

Figure 39:
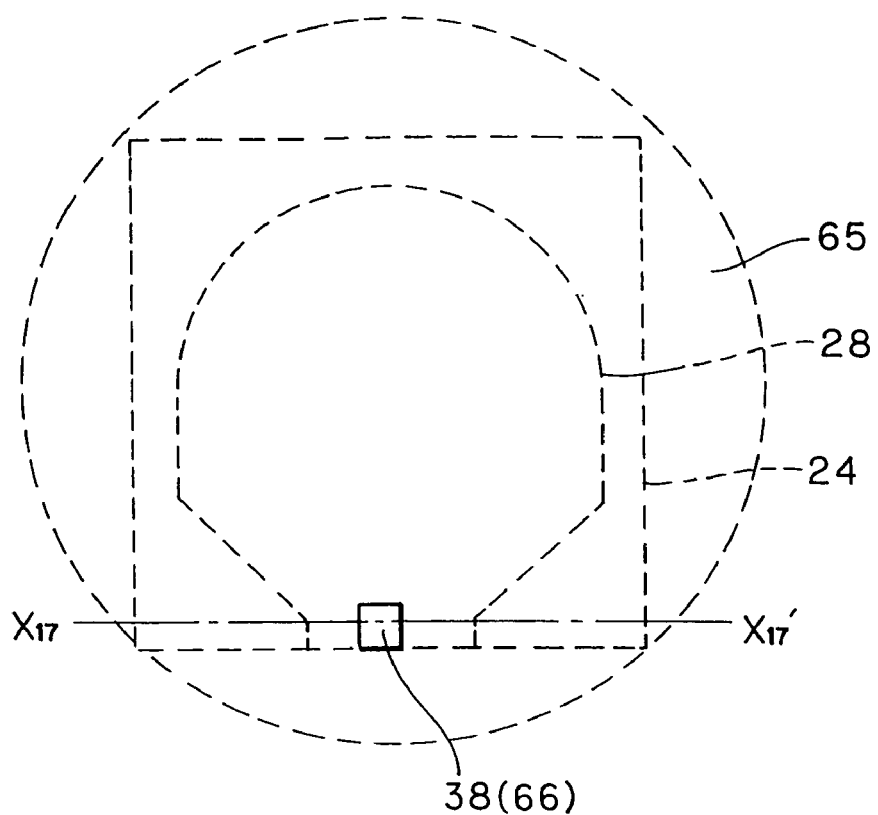
FIG. 39 is a schematic plan view of an upper core layer formed on the fifth nonmagnetic nonconductive layer in the process of head slider production.
Figure 40:
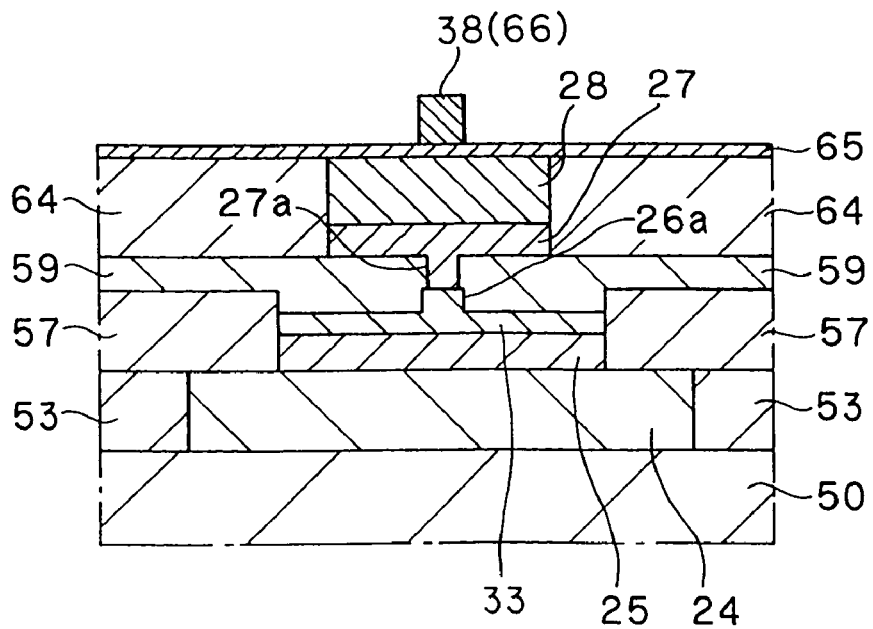
FIG. 40 is a schematic sectional view taken along the line $X_{17}$-$X_{17}'$ in FIG. 39.

Next, referring to FIGS. 39 and 40, there is illustrated the upper core layer 38 formed on the fifth nonmagnetic nonconductive layer 66 in the process of head slider production. FIG. 39 is a schematic plan view, enlarged in scale, of the portion C shown in FIG. 23, and FIG. 40 is a schematic sectional view taken along the line $X_{17}$-$X_{17}'$ in FIG. 39. As shown, a photoresist is applied to the firth nonmagnetic nonconductive layer 65 and cured to form a resist layer. The photolithography is utilized to pattern the resist layer to a predetermined form. The patterned resist layer is used to form a third soft magnetic layer 66 by sputtering or the like from an amorphous lamination layer for example, and then the resist layer is removed along with the third soft magnetic layer 66 formed on the resist layer. Thus, the upper core layer 38 having a predetermined width is formed on the fifth nonmagnetic nonconductive layer 64. Also, the fifth nonmagnetic nonconductive layer 64 is disposed opposite to the lower core layer 38 with the fifth nonmagnetic nonconductive layer 65 being laid between them to define the magnetic gap 37 whose width is a track width $Tw_2$. Note that the track width $Tw_2$ may be set to an appropriate value correspondingly to the system requirement.

Figure 41:
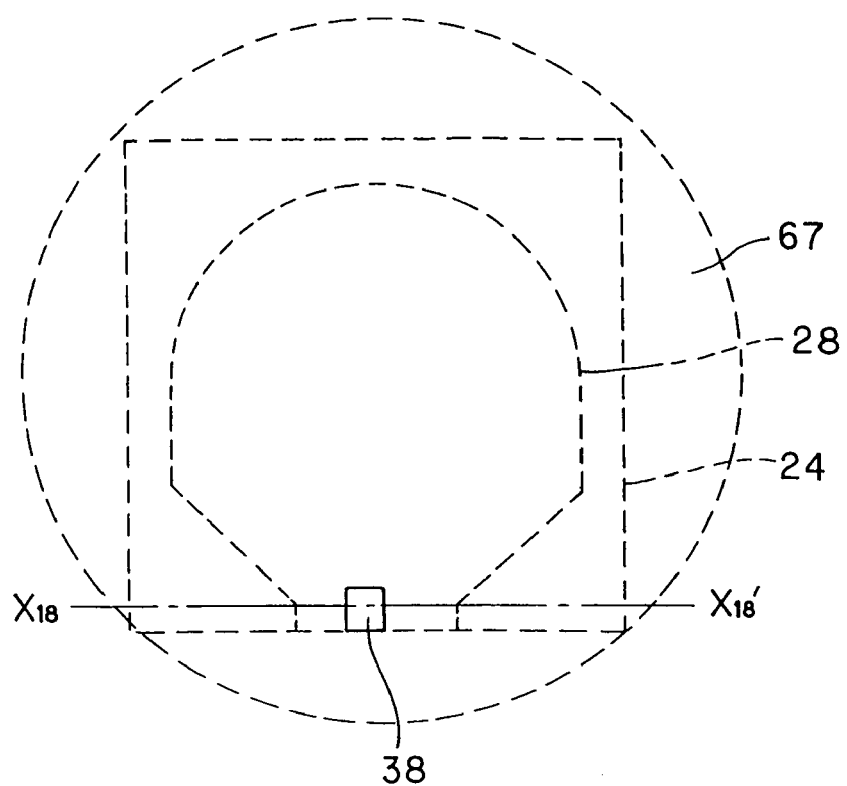
FIG. 41 is a schematic plan view of a sixth nonmagnetic nonconductive layer formed on the substrate and polished until the surface of the upper core layer is exposed, in the process of head slider production.
Figure 42:
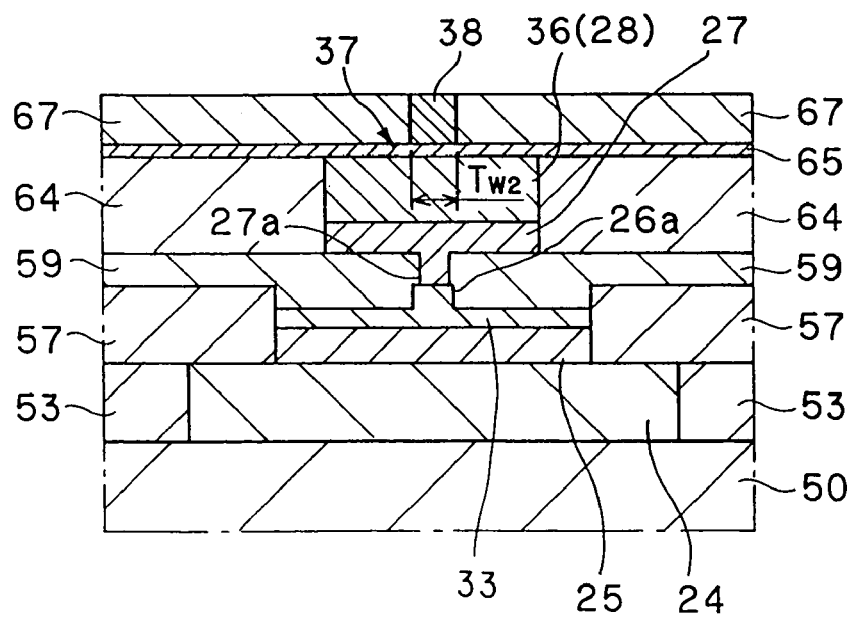
FIG. 42 is a schematic sectional view taken along the line $X_{18}$-$X_{18}'$ in FIG. 41.

Next, referring to FIGS. 41 and 42, there is illustrated a sixth nonmagnetic nonconductive layer 67 formed on the substrate 50 and polished until the surface of the upper core layer is exposed, in the process of head slider production. FIG. 41 is a schematic plan view, enlarged in scale, of the portion C shown in FIG. 23, and FIG. 42 is a schematic sectional view taken along the line $X_{18}$-$X_{18}'$ in FIG. 41. The sixth nonmagnetic nonconductive layer 67 of $Al_2O_3$ for example is formed by sputtering or the like over the substrate 50, and then polished until the plurality of upper core layers 38 formed on the substrate 50 is exposed. Thus, the sixth nonmagnetic nonconductive layer 67 is embedded between the substrate 50 and upper core layers 38 to provide a flat surface where no upper core layers 38 are formed on the substrate 50.

Figure 43:
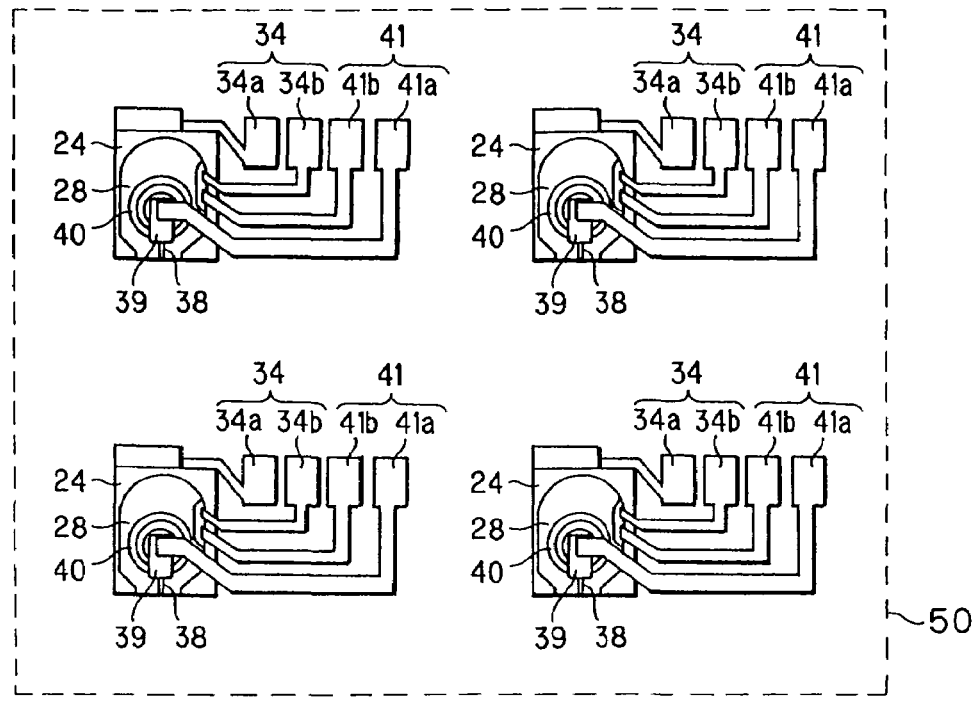
FIG. 43 is a schematic plan view of thin-film coils, back yokes and lead wires formed on the flattened substrate in the process of head slider production.

Next, the thin-film coils 40, back yokes 39 and lead wires 34 and 41 are formed on the flattened substrate 50 as shown in FIG. 43.

The thin-film coil 40 is spirally formed by sputtering around a portion where the lower core layer 36 and back yoke 39 abut each other, and a nonmagnetic nonconductive layer is formed to cover the thin-film coil 40. The thin-film coil 40 is formed from a conductive material such as Cu.

The back yoke 39 is formed in junction with the upper core layer 38 while abutting the lower core layer 36 at a generally central portion of the spirally formed thin-film col 40. Thus, the lower core layer 36, upper core layer 38 and back yoke 39 will form together the inductive type thin-film head 22.

As the lead wires 34 and 41, there are formed the lead wires 34a and 34b which are to electrically be connected to the lower and upper shielding layers 24 and 28, respectively, and the lead wires 41a and 41b which are to electrically be connected to the inner and outer circumferential ends, respectively, of the thin-film coil 40. More particularly, the photolithography is utilized to pattern a photoresist to a predetermined form. Etching is effected using the photoresist as a mask to form the lower and upper shielding layers 24 and 28 and a terminal recess in which a portion abutting the inner and outer circumferential ends of the thin-film coil 40 is exposed. A conductive layer of Cu having a thickness of about 6 μm is formed by electroplating using a copper sulfate solution for example, and then the photoresist is removed along with the conductive layer formed on the photoresist. Thus, the lower and upper shielding layers 24 and 28, inner and outer circumferential ends of the thin-film coil 40, and the conductive layer embedded in the terminal recess are electrically connected to each other. Then, a conductive layer of Cu having a predetermined form is formed by electroplating using a copper sulfate solution so as to be joined to the conductive layer embedded in the terminal recess. Thus, the lead wires 34a, 34b, 41a and 41b are formed as shown in FIG. 43. Note that the conductive layer may be formed by a method other than the electroplating so long as it will not adversely affect the other layers.

Figure 44:
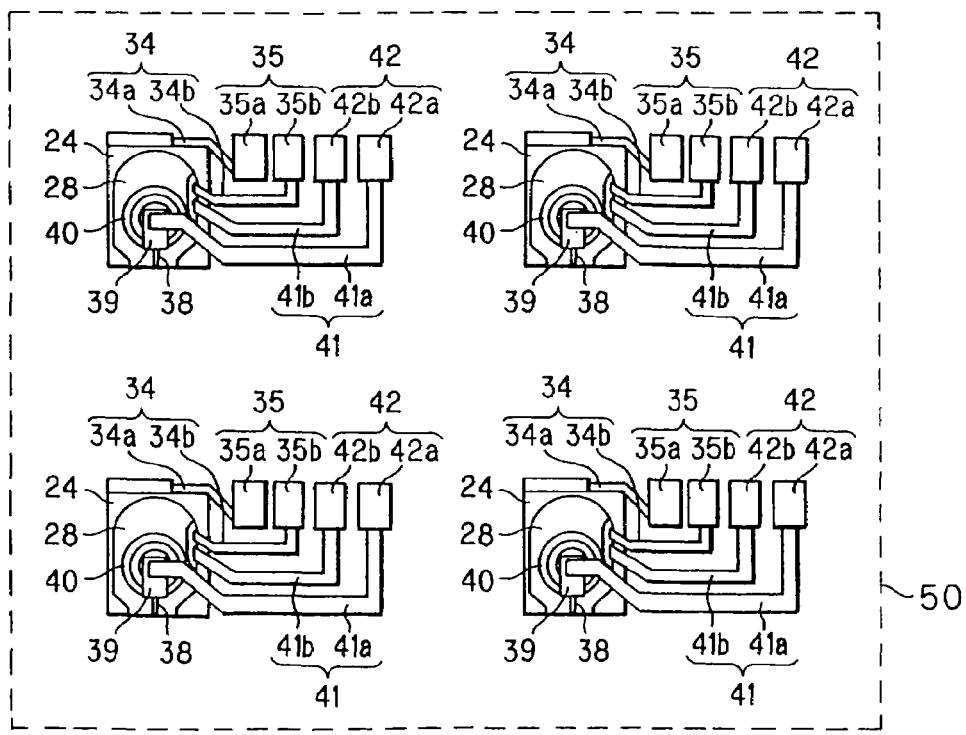
FIG. 44 is a schematic plan view of external connection terminals formed on the ends of the lead wires in the process of head slider production.

Next, the external connection terminals 35 and 42 are formed on the ends of the lead wires 34 and 41, respectively, as shown in FIG. 44. As the external connection terminals 35 and 42, there are formed the external connection terminals 35a and 35b which are to electrically be connected to the lead wires 34a and 34b, respectively, and the external connection terminals 42a and 42b which are to electrically be connected to the lead wires 41a and 41b, respectively. More particularly, the photolithography is utilized to pattern a photoresist to a predetermined form. The patterned photoresist is used to form a conductive layer of Au by sputtering, electroplating or the like for example, and the photoresist is removed along with the conductive layer formed on the photoresist. Thus, there will be formed the external connection terminals 35a, 35b, 42a and 42b as shown in FIG. 46.

Figure 45:
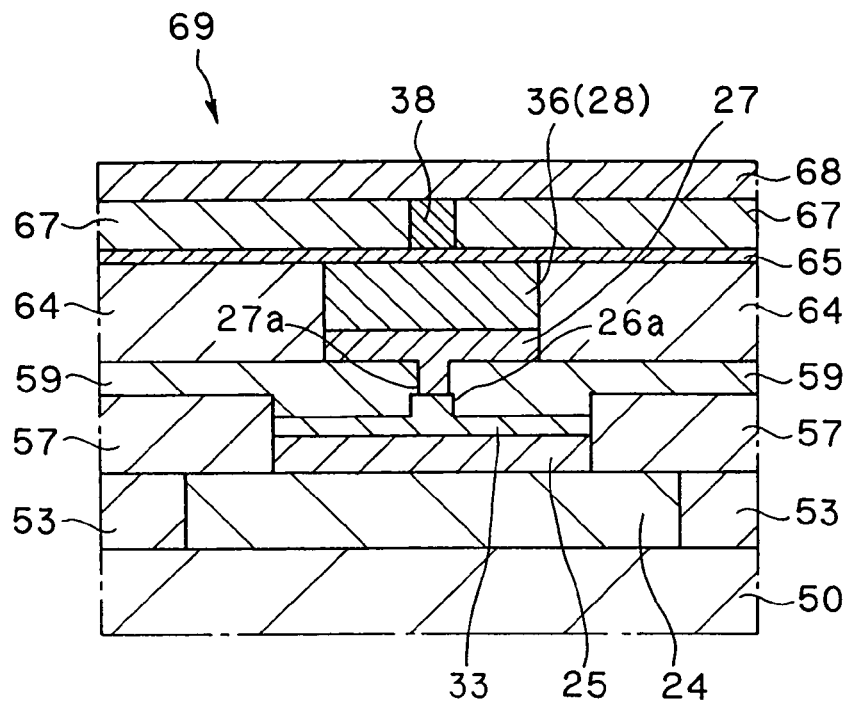
FIG. 45 is a schematic sectional view of a protective layer formed on the substrate and polished until the surface of the external connection terminal is exposed, in the process of head slider production.

Next, a protective layer 68 of $Al_2O_3$ for example is formed, as shown in FIG. 45, by sputtering or the like over the substrate 50, and then polished until the external connection terminals 35 and 42 formed on the substrate 50 are exposed. More specifically, the protective layer 68 is formed from $Al_2O_3$ for example by sputtering to a thickness of about 4 μm. Note that the protective layer 68 can be formed from other than $Al_2O_3$ so long as this material is nonmagnetic and nonconductive. Taking the hostile-environment property and abrasion resistance in consideration, the protective layer 68 should preferably be formed from $Al_2O_3$. Also, to form the protective layer 60, the evaporation process for example may be adopted instead of the sputtering. The external connection terminals 35 and 42 are polished until their surfaces are exposed. In this polishing, for example abrasive grains of diamond of about 2 μm in grain size are used to polish the external connection terminals 35 and 42 until their surfaces are exposed. Then, the surfaces are buffed with silicon abrasive grains for mirror-finish of the surfaces. Thus, there can be obtained the substrate 50 having formed thereon a plurality of head elements 69 which will eventually be the magnetic head 20.

Figure 46:
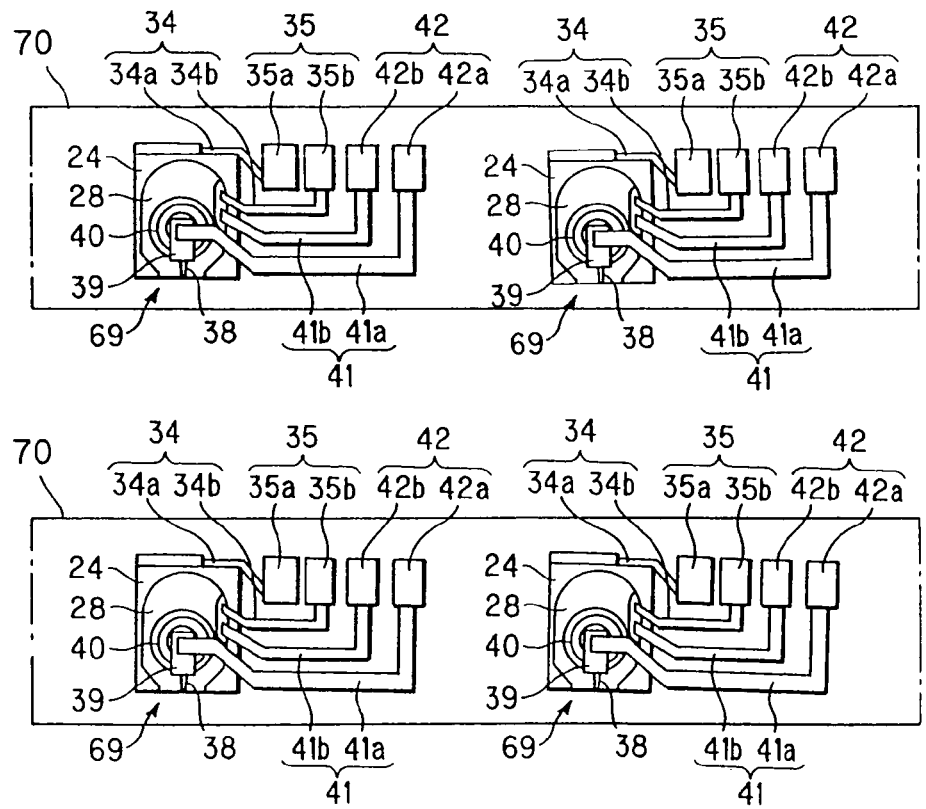
FIG. 46 is a schematic plan view of a plurality of bar-like head blocks formed by cutting the substrate into stripe shapes in the process of head slider production.

Next, the substrate 50 having the plurality of head elements 69 formed thereon is cut into strips as shown in FIG. 46 to provide bar-like head blocks 70 in which there are arranged side-by-side the head elements 69 which are to form the magnetic heads 20.

Next, the surface of the head block 70 which is to be the medium-opposite face 4a is polished on a surface plate to adjusts the height of the head element 69.

Conventionally, in case the first and second nonmagnetic conductive layers 54 and 62 which are to provide the lower and upper nonmagnetic conductive layers 25 and 27, respectively, are formed from Al for example, when the above polishing is effected, the first and second nonmagnetic conductive layers 54 and 62 which are to provide the lower and upper nonmagnetic conductive layers 25 and 27 will be elongated without being polished and thus a defect will be caused in the medium-opposite face 4a of the TMR head 21 of the head slider 4 by the elongation of the first and second nonmagnetic conductive layers 54 and 62.

However, since the first and second nonmagnetic conductive layers 54 and 62 which are to provide the lower and upper nonmagnetic conductive layers 25 and 27, respectively, are formed from the aforementioned nonmagnetic metal layer, it can be avoided that the first and second nonmagnetic conductive layers 54 and 62 which are to provide the lower and upper nonmagnetic conductive layers 25 and 27, respectively, will be elongated without being polished and thus a defect will be caused in the medium-opposite face 4a of the TMR head 21 by the elongation of the nonmagnetic metal layer.

Thus, the component elements forming together the magnetic head 20 are exposed from the medium-opposite face 4a and generally flush with each other.

Figure 47:
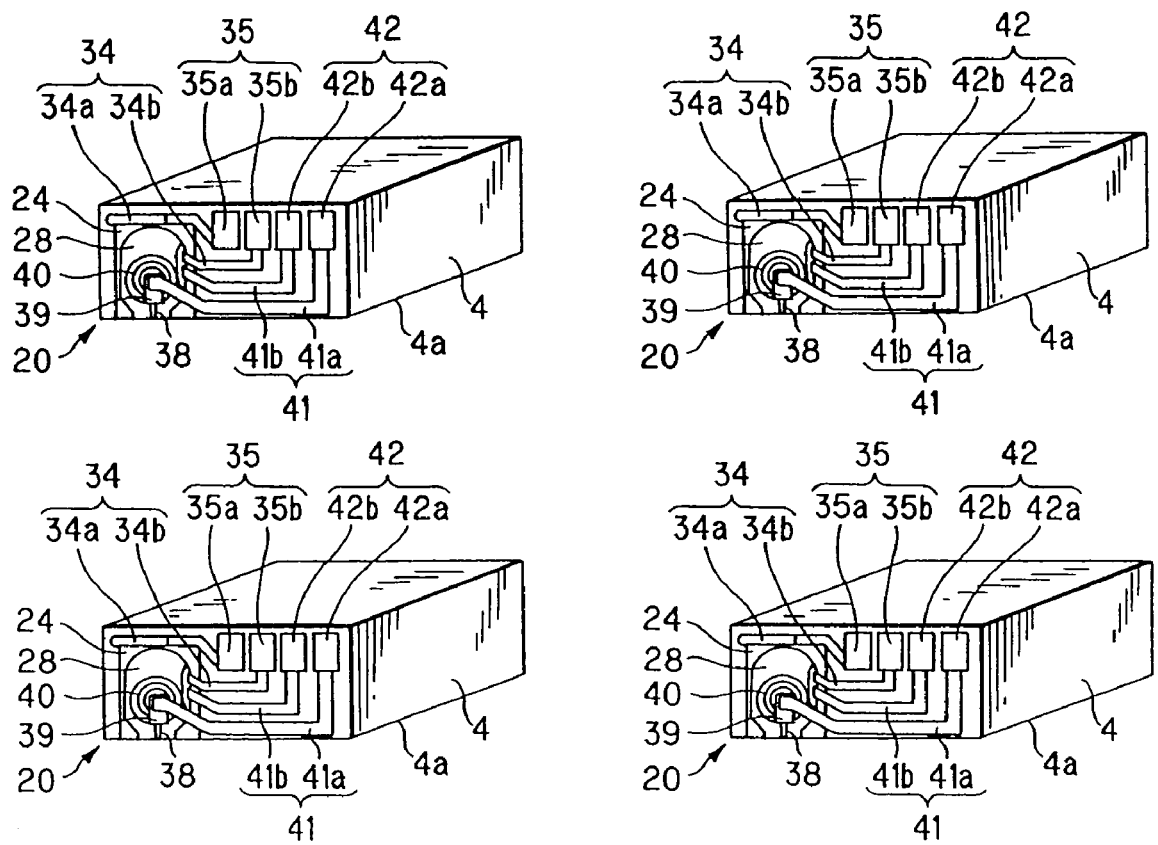
FIG. 47 is a schematic perspective view of a plurality of head sliders produced by splitting the head block into individual head chips in the process of head slider production.

Next, the head block 70 is recessed and tapered to form the airborne surface (ABS) of the head slider 4, and then is divided into individual head chips. Thus, there is produced a plurality of head sliders 4 on each of which the magnetic head 20 as shown in FIG. 47 is to be installed.

For use of the head slider 4 produced as in the foregoing, the head slider 4 is mounted on the free end of the suspension 12, and wiring terminals provided on the suspension 12 are electrically connected to the external connection terminals 35 and 42 of the magnetic head 20 with conductor of gold (Au) by wire bonding or the like. Thus, the magnetic head 20 can be put into contact with an external circuit. The head slider 4 will be installed to a hard disc drive as shown in FIG. 4 while being mounted on the suspension 12.

With the head slider 4 produced through the aforementioned processes, it can be prevented that when the head block 70 is polished, the nonmagnetic metal layers which are to provide the lower and upper nonmagnetic conductive layers 25 and 27 of the TMR head 21 will be elongated without being polished and thus a defect will be caused in the medium-opposite face 4a of the TMR head 21 by the elongation of the nonmagnetic metal layers.

Concerning each shielded TMR head formed from a single layer of Al, Cu, Au, Pt, Ta, Ti, Cr, W, Mo, V, Nb or Zr, as the nonmagnetic metal layer forming each of the lower nonmagnetic conductive layers 25 and 27, and each shielded TMR head formed from a lamination of a metal layer of Al, Cu, Au or Pt and a metal layer containing a meal element selected from Ta, Ti, Cr, W, Mo, V, Nb and Zr, the yield of production was evaluated when a defect was caused in the shielded TMR head by the elongation of the nonmagnetic metal layer.

The results of yield evaluation are shown in Table 1. Note that in Table 1, a circle indicates that the yield is 80% or more, triangle indicates that the yield is 30% to 80%, and cross mark indicates that the yield is less than 30%.

TABLE 1

|  | Al | Cu | Au | Pt | Ta | Ti | Cr | W | Mo | V | Nb | Zr |
|---|---|---|---|---|---|---|---|---|---|---|---|---|
| Single layer | x | x | x | Δ | o | o | o | o | o | o | o | o |
| Lamination layer | o | o | o | o | / | / | / | / | / | / | / | / |

As seen from the evaluation results shown in Table 1, the yield of production of the TMR head is low in case the TMR head is formed from Al, Cu or Au of the single layers of Al, Cu, Au and Pt, respectively, which are conventionally used as the nonmagnetic metal layer, and also the yield is not high when the TMR head is formed from a Pt layer.

On the contrary, as will be seen from Table 1, when Ta, Ti, Cr, W, Mo, V, Nb or Zr is used as the nonmagnetic metal layer in the TMR head according to the present invention, each of the TMR heads can be produced with a high yield.

It will also be seen that when a lamination of a metal layer of Al, Cu, Au or Pt and a metal layer containing a metal element selected from Ta, Ti, Cr, W, Mo, V, Nb and Zr is used, the TMR head can be produced with a high yield.

Also, concerning each shielded TMR head formed from a single layer containing each of the alloys AlTa, AlTi, AlCr, AlW, AlMo, AlV, AlNb ad AlZr as the nonmagnetic metal layer which is used to form the lower and upper nonmagnetic conductive layers 25 and 27, the yield of production was evaluated when a defect was caused in the shielded TMR head by the elongation of the nonmagnetic metal layer.

The results of yield evaluation are shown in Table 2. Note that in Table 2, a circle indicates that the yield is 80% or more, triangle indicates that the yield is 30% to 80%, and cross mark indicates that the yield is less than 30%. For reference, there are also shown the results of yield evaluation on the shielded TMR heads each formed from a single layer of Al, Cu, Au or Pt.

TABLE 1

|  | Al | Cu | Au | Pt | AlTa | AlTi | AlCr | AlW | AlMo | AlV | AlNb | AlZr |
|---|---|---|---|---|---|---|---|---|---|---|---|---|
| Single layer | x | x | x | Δ | o | o | o | o | o | o | o | o |

As seen from the evaluation results shown in Table 2, the TMR head can be produced from each of the alloys AlTa, AlTi, AlCr, AlW, AlMo, AlV, AlNb and AlZr as the nonmagnetic metal layer with an improved yield.

In this case, it is evident that the TMR head can be produced with a high yield even from a lamination layer including a metal layer containing each of these alloys.

As having been described in the foregoing, the present invention makes it possible to prevent the lower and upper shielding layers 24 and 28 in the TMR head 21 from electrically being short-circuited between them, and allow a mass production of a high-yield, high-quality TMR head 21 without increase of the manufacturing costs and with a considerably improved productivity.

In the foregoing, the present invention has been described concerning the composite type thin-film magnetic head including the TMR head 21 as the read head and the inductive type thin-film head 22 as the write head. It is of course however that the present invention is applicable to a magnetic head constructed from only the TMR head.

Also in the foregoing, the present invention has been described concerning the hard disc drive as one example of the recorder/player according to the present invention. However, the present invention is also applicable to a magnetic disc drive using a flexible disc as the recording medium, a magnetic tape drive using a magnetic tape as the recording medium, and the like.

What is claimed is:

1. A magnetic tunnel effect type magnetic head comprising:
   a magnetic tunnel junction element sandwiched with upper and lower conductive gap layers between upper and lower magnetic shielding layers,
   wherein at least one of the conductive gap layers is formed from at least one nonmagnetic metal layer containing a metal element selected from Ta, Ti, Cr, W, Mo, V, Nb and Zr, wherein the magnetic tunnel junction element includes a free layer on a fixed layer and a tunnel barrier layer disposed between the free layer and the fixed layer, and wherein a width of the free layer is equal to or less than a width of the fixed layer.

2. A recorder/player which records and/or plays back a signal to and/or from a magnetic recording medium comprising:
   a magnetic tunnel effect type magnetic head having a magnetic tunnel junction element sandwiched with conductive gap layers between a pair of magnetic shielding layers,
   wherein at least one of the conductive gap layers is formed from at least one nonmagnetic metal layer containing a metal element selected from Ta, Ti, Cr, W, Mo, V, Nb and Zr, wherein the magnetic tunnel junction element includes a free layer on a fixed layer and a tunnel barrier layer disposed between the free layer and the fixed layer, and wherein a width of the free layer is equal to or less than a width of the fixed layer.

\* \* \* \* \*